(12) United States Patent
Murakami et al.

(10) Patent No.: US 6,603,767 B1
(45) Date of Patent: *Aug. 5, 2003

(54) CELL EXCHANGING DEVICE

(75) Inventors: Yasuo Murakami, Kanagawaken (JP); Takaaki Toyama, Kanagawaken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/373,595

(22) Filed: Aug. 13, 1999

(30) Foreign Application Priority Data

Jul. 14, 1999 (JP) .......................................... 11-200267

(51) Int. Cl.[7] .............................................. H04L 12/56
(52) U.S. Cl. .................... 370/395.64; 370/473; 370/474
(58) Field of Search ................................ 370/474, 473, 370/395.1, 395.21, 395.31, 395.43, 395.64

(56) References Cited

U.S. PATENT DOCUMENTS

| | | | |
|---|---|---|---|
| 5,802,051 A | * | 9/1998 | Petersen et al. ........ 370/395.42 |
| 6,041,038 A | * | 3/2000 | Aimoto ....................... 370/229 |
| 6,061,354 A | * | 5/2000 | Morikawa et al. .......... 370/389 |
| 6,275,494 B1 | * | 8/2001 | Endo et al. ............. 370/395.52 |
| 6,330,242 B1 | * | 12/2001 | Ogawa et al. ......... 370/395.52 |
| 6,449,276 B1 | * | 9/2002 | Subbiah et al. .......... 370/395.1 |

OTHER PUBLICATIONS

Toyama et al., "Variable Length Packet Switch", Aug. 13, 1999, U.S. patent application No. 09/373,594.*

* cited by examiner

*Primary Examiner*—Chau Nguyen
*Assistant Examiner*—Nhat Do
(74) *Attorney, Agent, or Firm*—Antonelli, Terry, Stout & Kraus, LLP

(57) ABSTRACT

Provided is a cell exchanging device which realizes switching of an AAL2 connection level using an existing ATM switch, thus preventing deterioration of a transfer quality of other ATM cells. In an input-side ATM line corresponding section, provided are an ATM cell demultiplexing section 113-I-1 for extracting and separating only an AAL2 cell from an ATM cell, an AAL2 DMX 113-I-2 for converting from the AAL2 cell to an AAL2 partial fill cell, and an ATM cell multiplexing section 113-I-4 for multiplexing and packing the ALL2 partial fill cell and the ATM cell other than AAL2. Before entering to the ATM switch, a priority order of each ATM cell is determined based on class information presented in the ATM line corresponding section, and reading-out from the ATM cell multiplexing section is controlled. Similarly, also in an output-side ATM line corresponding section, at the time of a transfer to a transmission path, a priority order of each ATM cell is determined based on class information presented in the input-side ATM line corresponding section and a reading-out is performed.

17 Claims, 23 Drawing Sheets

| ID1 WITHIN DEVICE | INPUT CID | ID2 WITHIN DEVICE | CID WITHIN DEVICE |
|---|---|---|---|
| ⋮ | ⋮ | ⋮ | ⋮ |
| 3 | 11 | 1 | 0 |
| 3 | 12 | 2 | 0 |
| 3 | 13 | 3 | 0 |
| 3 | 14 | 4 | 0 |
| 5 | 11 | 5 | 0 |
| 5 | 12 | 6 | 0 |
| ⋮ | ⋮ | ⋮ | ⋮ |

| ID3 WITHIN DEVICE | AAL | CLASS | OUTPUT LINE NO. | INPUT LINE NO. | ID1 WITHIN DEVICE |
|---|---|---|---|---|---|
| ... | | | ... | | |
| 11 | 1 | 2 | 1 | 0 | 1 |
| 12 | 1 | 2 | 1 | 0 | 2 |
| ... | | | ... | | |

- H1: 113-O-28
- H10: CELL ID NO. WITHIN DEVICE
- H11
- H13
- R1: ROUTING INFORMATION
- R10
- R11
- R12

| INPUT LINE NO. | ID1 WITHIN DEVICE | OUTPUT VPI | OUTPUT VCI |
|---|---|---|---|
| | ⋮ | | ⋮ |
| 1 | 1 | 10 | 20 |
| 1 | 2 | 10 | 21 |
| 0 | 1 | 10 | 22 |
| 0 | 2 | 10 | 23 |
| m | 1 | 10 | 24 |
| | ⋮ | | ⋮ |

CELL ID NO. WITHIN DEVICE — H1, H11
OUTPUT CELL HEADER INFORMATION — H2
H10
112-O-2

| CLASS | SORT OF CELL | EXAMPLE |
|---|---|---|
| 1 | TOP PRIORITY CELL OTHER THAN AAL2 | CBR |
| 2 | PRIORITY CELL OF AAL2 | rt-VBR |
| 3 | PRIORITY CELL OTHER THAN AAL2 | nrt-VBR |
| 4 | NON-PRIORITY CELL OF AAL2 | nrt-VBR |
| 5 | NON-PRIORITY CELL OTHER THAN AAL2 | UBR |

FIG.17

AAL2 CELL

AAL2 PARTIAL FILL CELL

CELL EXCHANGING DEVICE

BACKGROUND OF THE INVENTION

The present invention relates to a cell exchanging device, more particularly to an Asynchronous Transfer Mode (ATM) relay exchanging device which exchanges an ATM cell cellularized by an ATM Adaptation Layer (AAL) type 2.

The ATM adaptation layer (AAL) enhances the service provided by the ATM layer to support functions required by the next higher layer. The AAL performs functions required by the user, control and management planes and supports the mapping between the ATM layer and next higher layer. The functions performed in the AAL depend upon the higher layer requirements. In an International Telecommunication Union-Telecommunication Standardization Sector (ITU-T), four types including an AAL type 1 (AAL1), an AAL type 2 (AAL2), an AAL type 3/4 (AAL3/4) and an AAL type 5 (AAL5) are defined as an AAL protocol in the ITU-T recommendations I.362 and I.363. The AAL1 is mainly used when voices of 64 kbit/s are transferred on the ATM. The AAL2 is used when low bit rate voices compressed and encoded to 8 kbit/s or the like are transferred on the ATM. The AAL3/4 and the AAL5 are mainly used when data is transferred on the ATM.

FIG. 22 shows an explanatory view of an AAL2 cellularizing system. In order to transfer a low bit rate voice with little delay and high efficiency, as shown in FIG. 22, the AAL2 (ITU-T recommendation I.363.2) presents a 3-octets Common Part Sublayer (CPS) packet header, which includes an identifier called Channel Identifier (CID), to each of voice channels (CPS-packetting), and multiplexes and packs a plurality of CPS packets in a single ATM cell. Accordingly, a plurality of AAL2 level connections are multiplexed in a single Virtual Channel (VC) connection of the ATM.

As shown in FIG. 22, the CPS packet is composed of a 3-Bytes packet header and a variable length CPS packet payload portion, and besides the foregoing CID the CPS packet header is composed of a Length Indicator (UL) for storing the packet length of the CPS packet and an User-to-User Indication (UUI) that is a user-to-user identifier and a Header Error Control (HEC) for controlling a header error.

When an application of AAL2 to a network is considered, with regard to the AAL2, CPS packets having a different CID are multiplexed and packed into a single ATM cell, so that VC connections between nodes must be provided in a mesh form when a network is constructed by only an existing VC switch. For this reason, there has been a problem that the number of VC connections significantly increases as the number of nodes increases. As means for solving this problem, as an example shown in, for example, "a study on a method for constituting a network using an AAL type 2" of TR of IEICE SSE98-119, 1998, a method in which AAL2 level connections connected to different nodes are multiplexed and packed into one VC connection and an AAL2 level switching is performed in an intermediate node has been known to be effective. As described above, by providing an AAL2 level switching function in the network, it is satisfactory that the VC connection is set only for an adjacent node, thus preventing an increase in the number of the VC connections.

Next, in FIG. 23 an explanatory view of conversion example from an AAL2 cell to an AAL2 partial fill cell is shown. As described above, in the AAL2 the CPS packets having different CIDs are multiplexed and packed into one ATM cell. For this reason, in order to carry out the AAL2 level switching, a switching for each of the CPS packets is necessary, so that an existing ATM switch cannot be used as it is. Accordingly, in order to perform the AAL2 level switching using an existing ATM switching, as shown in FIG. 23, in an ATM line corresponding section, it is required to convert the ATM cell (hereinafter referred to as an AAL2 cell), in which a plurality of CPS packets are multiplexed and packed, to an ATM cell (hereinafter, referred to as an AAL2 partial fill cell), which is constituted by only one CPS packet, before entering into the ATM switch.

When the ALL2 cell is converted to the AAL2 partial fill cell in the ATM line corresponding section before the entry into the ATM switch, as shown in FIG. 23, the number of the ATM cells increases compared to that before the conversion an the example shown in FIG. 23, since one ATM cell is converted to the four AAL2 partial fill cells, a throughput is quadrupled.) Moreover, since the CPS packet takes a variable length form, the number of the ATM cells after the conversion varies. Accordingly, when the AAL2 level switching is carried out by the existing ATM switch, a new problem arises, in which the AAL2 partial fill cells have an effect on a transfer of the ATM cell cellularized by an AAL other than the AAL2. To be specific, since the AAL2 cell was converted to the AAL2 partial fill cells, the throughput after the conversion increases, and such a case in which an output of the ATM cell cellularized by other AALs is delayed or the ATM cell is discarded by the AAL2 partial fill cells may arise.

SUMMARY OF THE INVENTION

Considering the foregoing points, the object of the present invention is to avoid an influence which the AAL2 partial fill cells have on a transfer of the ATM cell cellularized by an AAL other than the AAL2, by assigning a priority order in which each of cells are transferred, under the condition where the AAL2 partial fill cells and the ATM cell cellularized by an AAL other than the AAL2 are mixed.

Furthermore, in order to use the AAL2 partial fill cells with an existing ATM switch, the object of the present invention is to achieve an AAL2 level switching using an existing ATM switch by providing information for identifying the AAL2 partial fill cells in an ATM cell header within a device.

When the AAL2 cell is converted to the AAL2 partial fill cells in the ATM line corresponding section, the object of the present invention is to prevent the effect on the AAL2 partial fill cells and deterioration of a transfer quality of ATM cells in spite of an increase in the number of the ATM cells after the conversion, by performing a priority control in an ATM cell level depending on a grade of quality.

In the present invention, provided are an ATM cell demultiplexing section for extracting and separating only AAL2 cell from each of ATM cells in an ATM line corresponding section on an input side; a cell conversion section AAL2 DMX for converting the AAL2 cell to AAL2 partial fill cells; and an ATM cell multiplexing section for multiplexing ATM cells other than the AAL2 partial fill cells and the AAL2, and a priority order for each of the ATM cells is determined based on class information presented in the ATM line corresponding section, before the ATM cells are inputted to an ATM switch section, and reading-out from the ATM cell multiplexing/packing is controlled. Similarly, in an ATM line corresponding-section on an output side, provided are an ATM cell demultiplexing section for extracting and separating only AAL2 partial fill cell from each of ATM cells; a cell conversion section AAL2 MUX for converting from the AAL2 partial fill cells to the AAL2 cell; and an ATM cell multiplexing section for multiplexing the ATM cells other than the AAL2 cell and the AAL2, and when the ATM cell is transferred on a transmission path, a priority order for each of the ATM cells is determined based on class information presented in the ATM line corresponding section on the input side and reading-out from the ATM cell multiplexing section is controlled, whereby an AAL2 level switching can be realized using an existing ATM switch.

According to the means for solving the subject of the present invention, provided is a cell exchanging device which exchanges a plurality of variable length packets multiplexed and packed into one cell to be transferred in an Asynchronous Transfer Mode, comprising:

a plurality of receiving interface sections for receiving a cell;

a plurality of transmitting interface sections for transmitting the cell; and a switching section for exchanging the cell to which the foregoing receiving interface sections and the foregoing transmitting interface sections are connected, wherein:

each of the foregoing receiving interface section includes a receiving cell transfer control section which disassembles the received cell to demultiplex and unpacked the plurality of variable length packets multiplexed and unpacked in the received cell, and converts the received cell to a cell which has one of the demultiplexd and unpacked variable length packets, thereby transferring the cell to the foregoing switching section, the foregoing switching section transfers the cell transferred from the foregoing receiving interface section to the foregoing transmitting interface section where a transmsssion processing is performed depending on a header value of the cell, and the foregoing transmitting interface section includes a transmitting cell transfer control section which demultiplexs and unpacks the variable length packet from the cell transferred from the foregoing switching section and multiplexes and packs a plurality of variable length packets in one cell, the plurality of variable length packets corresponding to the same output path.

BRIEF DESCRIPTION OF THE DRAWINGS

For a more complete understanding of the present invention and the advantages thereof, reference is now made to the following description taken in conjunction with the accompanying drawings, in which;

FIG. 9 is a view showing a constitution of a packet header conversion table within the cell conversion section AAL2 DMX;

FIG. 14 is a view showing a constitution of an ATM cell header conversion table within the cell conversion section AAL2 MUX;

FIG. 16 is a view showing a constitution of an ATM cell header conversion table within an ATM layer processing section on the output side;

FIG. 17 is a table showing a correspondence between each of ATM cell sorts and a quality class corresponding thereto;

DETAILED DESCRIPTION OF THE PREFERRED EMBODIMENTS (1) First Embodiment

Figure 1:
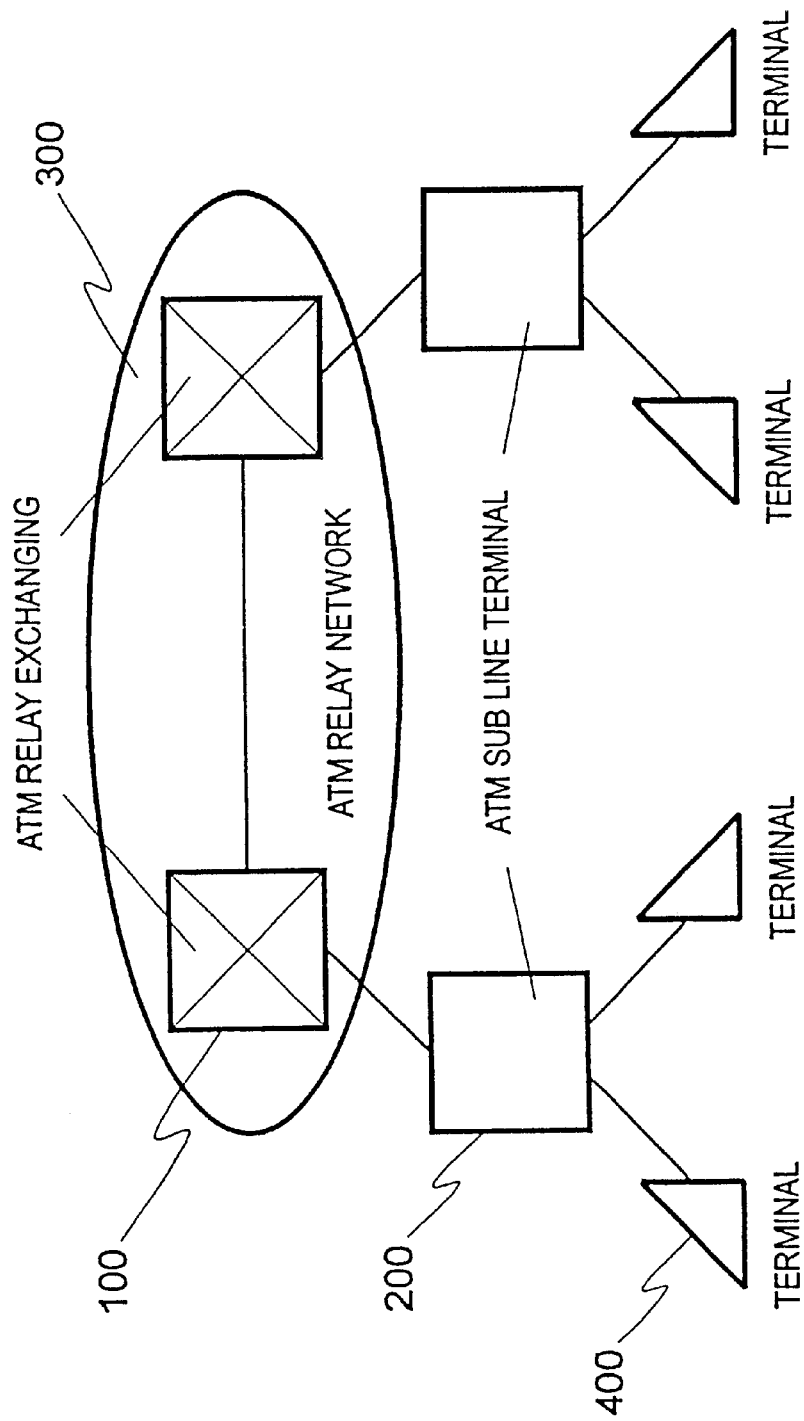
FIG. 1 is a view showing a system when an ATM relay exchanging device according to the present invention is used in a network.

FIG. 1 is a view showing a system when an ATM relay exchanging device of the present invention is used in a network. This network comprises a terminal 400; an ATM subscriber interface device 200 and an ATM relay exchanging device 100. In order to transmit various kinds of application data, for example, voices, images, data or the like, which is generated by the terminal 400, via an ATM relay network 300, an ATM Cell Assembly and Disassembly (hereinafter, referred to as a CLAD) function is provided in the ATM subscriber interface device 200. Information celluarid in the ATM subscriber interface device 200 is relayed and exchanged in the ATM relay exchanging device 100.

Figure 2:
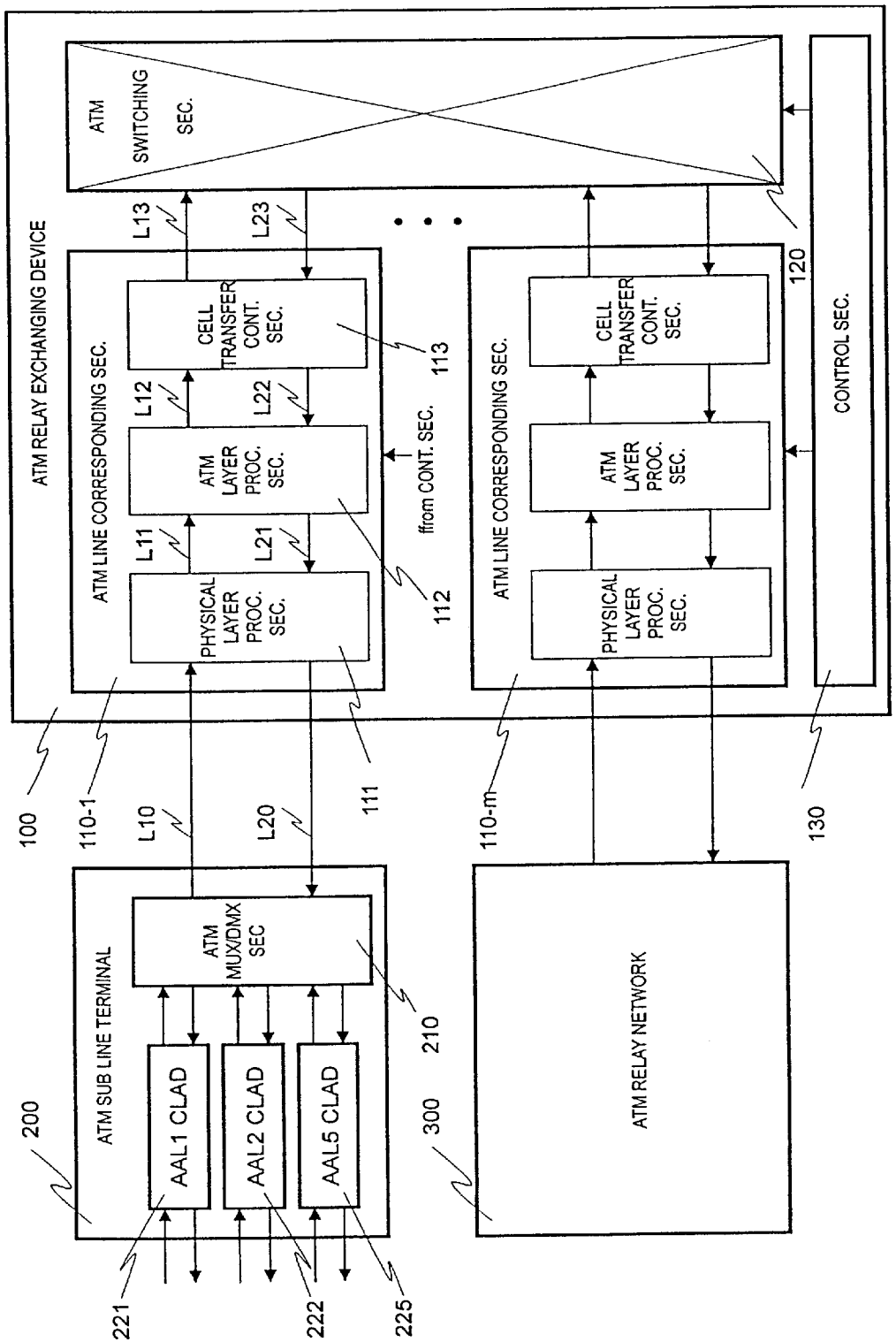
FIG. 2 is a view showing a constitution of a system of an ATM switch according to the present invention.

FIG. 2 shows a constitution of a system of the ATM switch according to the present invention. As shown in FIG. 2, in the ATM subscriber interface device 200, provided are an AAL1 CLAD221 for cellularizing 64 kbit/s voice, an AAL2 CLAD222 for cellularizing a low bit rate voice and an AAL5 CLAD225 for cellularizing data depending on sorts of data which arrives thereto. Information cellularized in each CLAD is multiplexed and packed into the ATM cell multiplexing/demultiplexing section 210, and transferred to a transmission path L10. Similarly, an ATM cell transferred from a transmission path L20 is distributed to each CLAD by the ATM multiplexing/demultiplexing section 210, and decellularized in each CLAD.

Information converted to an ATM cell in the ATM subscriber line terminal 200 is relayed and exchanged in the ATM relay exchanging device 100. The ATM relay exchanging device 100 is equipped with an exchanging function for AAL2 cell and AAL2 partial fill cell in addition to the switching function of the VC connection level.

Figure 3:
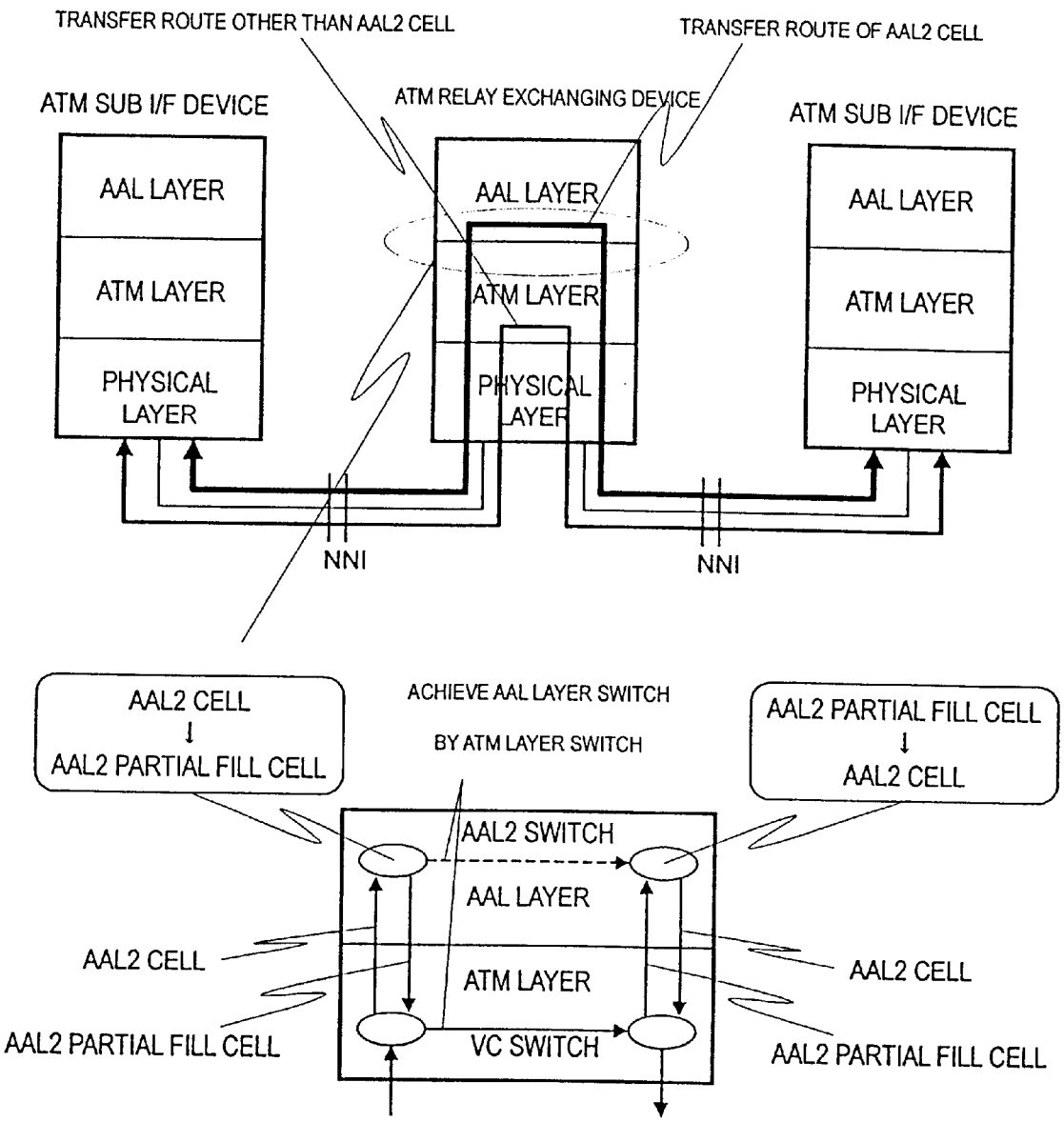
FIG. 3 is an explanatory view showing a protocol processing within the ATM relay exchanging device according to the present invention.

FIG. 3 is an explanatory view showing a protocol structure which is processed in the ATM relay exchanging device according to the present invention. FIG. 3 (upper part) shows a protocol stack processed by the ATM subscriber interface device 200 and the ATM relay exchanging device 100, a transfer route of the AAL2 cell and a transfer route of a cell other than the AAL2 cell. FIG. 3 (lower part) shows processings for the AAL and ATM layers in the ATM relay exchanging device 100 in detail.

The ATM cell other than the ALL2 inputted from the transmission path is subjected to a switching of the VC connection level in the ATM layer, and outputted to the transmission path again. On the other hand, the AAL2 cell is converted to the AAL2 partial fill cells in the ATM layer. Thereafter, the AAL2 partial fill cells are subjected to a switching of the VC connection level in the ATM layer. Then, after the switching of the VC connection level, the AAL2 partial fill cells are converted to the AAL2 cell in the AAL layer. Thereafter, the AAL2 cell is outputted to the transmission path. As described above, by equipping the ATM relay exchanging device 100 with a conversion function for the AAL2 cell and the AAL2 partial fill cell, the switching function of the AAL2 level can be achieved by the switching function of the VC connection level.

Hereupon, a constitution of the ATM relay exchanging device 100 will be shown concretely. As shown in FIG. 2, the ATM relay exchanging device 100 possesses a function to relay an ATM cell transmitted from each ATM subscriber interface device, and comprises an ATM line corresponding section 110-1 to 110-m, an ATM switching section 120 and a control section 130. The ATM switching section 120 is a switch for outputting a cell inputted from a certain path to another path, and refers to a predetermined area within an ATM cell header to determine a path to which the cell is to be outputted.

The ATM line corresponding section 110-1 to 110-m comprises a physical layer processing section 111, an ATM layer processing section 112 and a cell transfer control section 113. The physical layer processing section 111 receives a signal supplied from the transmission path L10, and extracts an ATM cell from a frame of the transmission path, thus transferring the ATM cell to the ATM layer processing section 112. The physical layer processing section 111 buries the ATM cell transferred from the ATM layer processing section 112 in the frame on the transmission path L20, and outputs the ATM cell. The ATM layer processing section 112 analyzes VPI/VCI information within the header of the ATM cell which was extracted by the physical layer processing section 111, and converts it to an ATM cell header within the device, thus transferring it to the cell transfer control section 113. Moreover, the ATM layer processing section 112 obtains VPI/VCI information on the transmission path from the header of the ATM cell which is transferred from the cell transfer control section 113, and inserts the VPI/VCI information in a predetermined area in the header of the ATM cell thus transferring the ATM cell to the physical layer processing section 111. The cell transfer control section 113 refers to a predetermined area in the header of an ATM cell within the device, which is transferred from the ATM layer processing section 112, and performs a transfer control for the ATM cell to transmit the ATM cell to the ATM switching section 120. On the contrary, the cell transfer control section 113 refers to a predetermined area in the header of an ATM cell within the device, which is transferred from the ATM switching section 120, and performs a transfer control for the ATM cell to transfer the ATM cell to the ATM cell layer processing section 112. Moreover, conversions of various kinds of headers and setting of paths are controlled by the control section 130.

Figure 4:
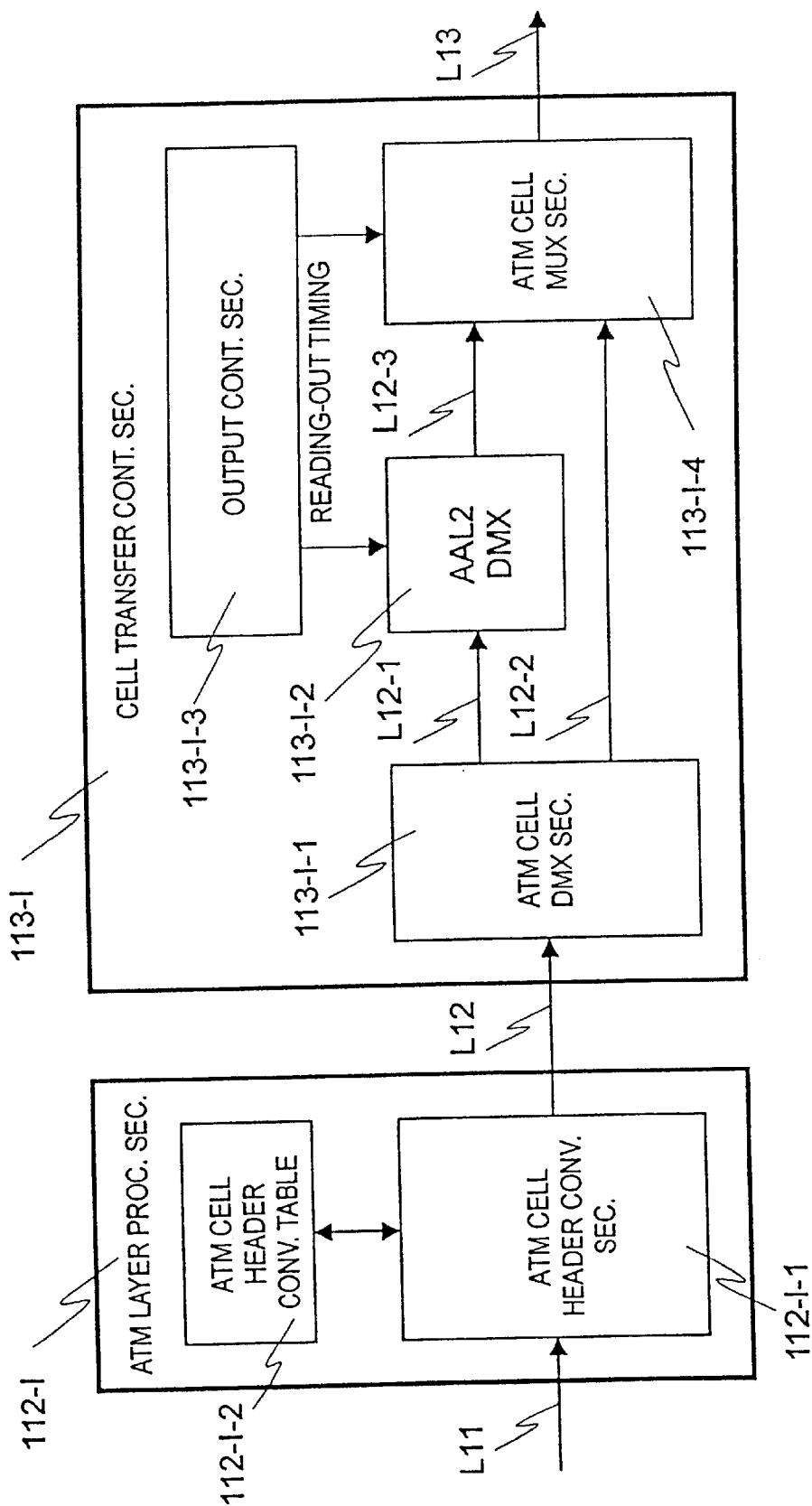
FIG. 4 is a view showing a constitution of an ATM line corresponding section on an input side.
Figure 5:
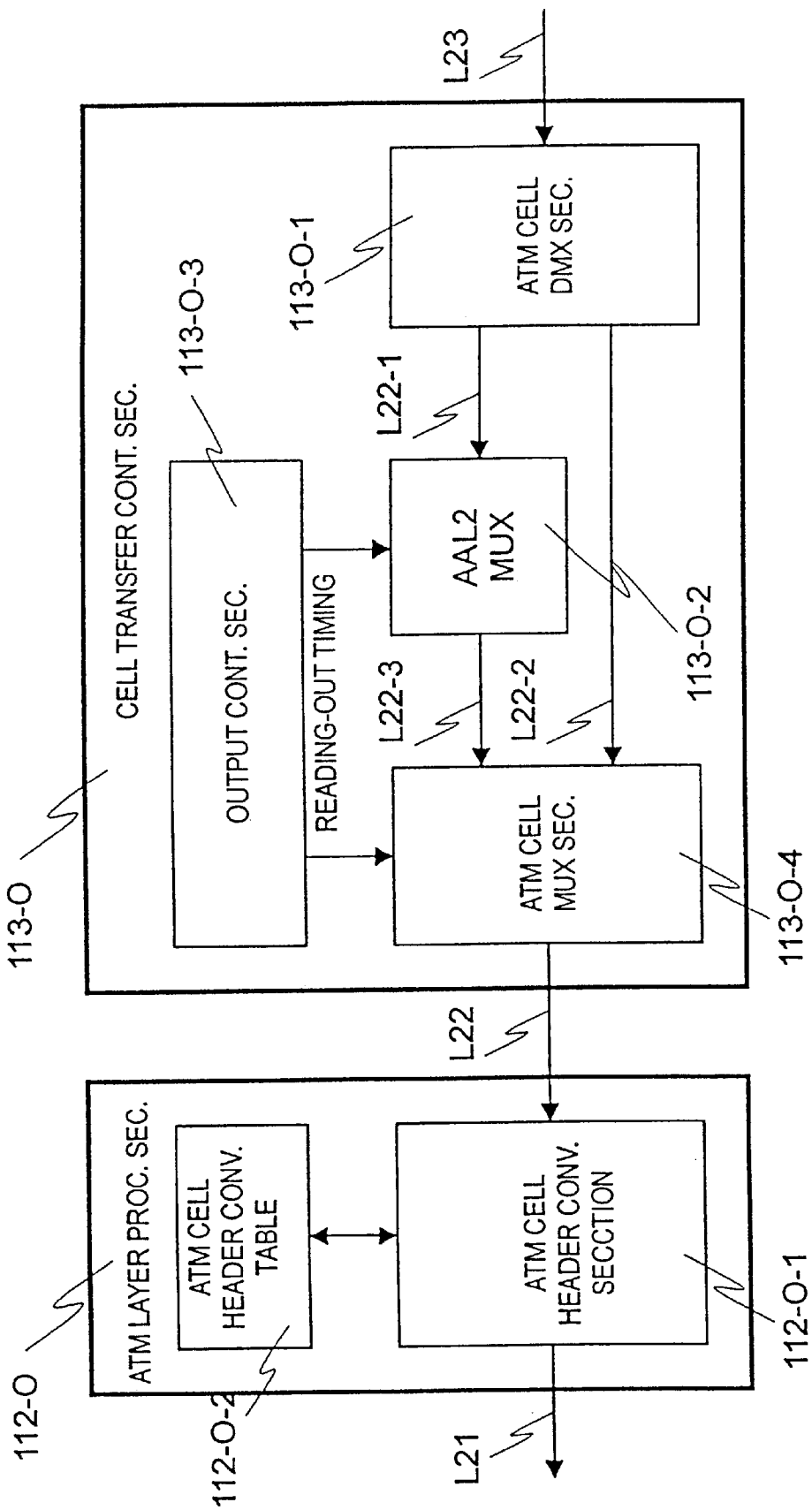
FIG. 5 is a view showing a constitution of an ATM line corresponding section on an output side.

Next, a constitution of the ATM line corresponding section 110-1 to 110-m will be described concretely. FIG. 4 shows constitutions of the ATM layer processing section 112-I and the cell transfer control section 113-I on the input side, and FIG. 5 shows constitution of the ATM layer processing section 112-O and the cell transfer control section 113-O on the output side.

A process for the ATM cell on the input side will be first described.

Figure 6:
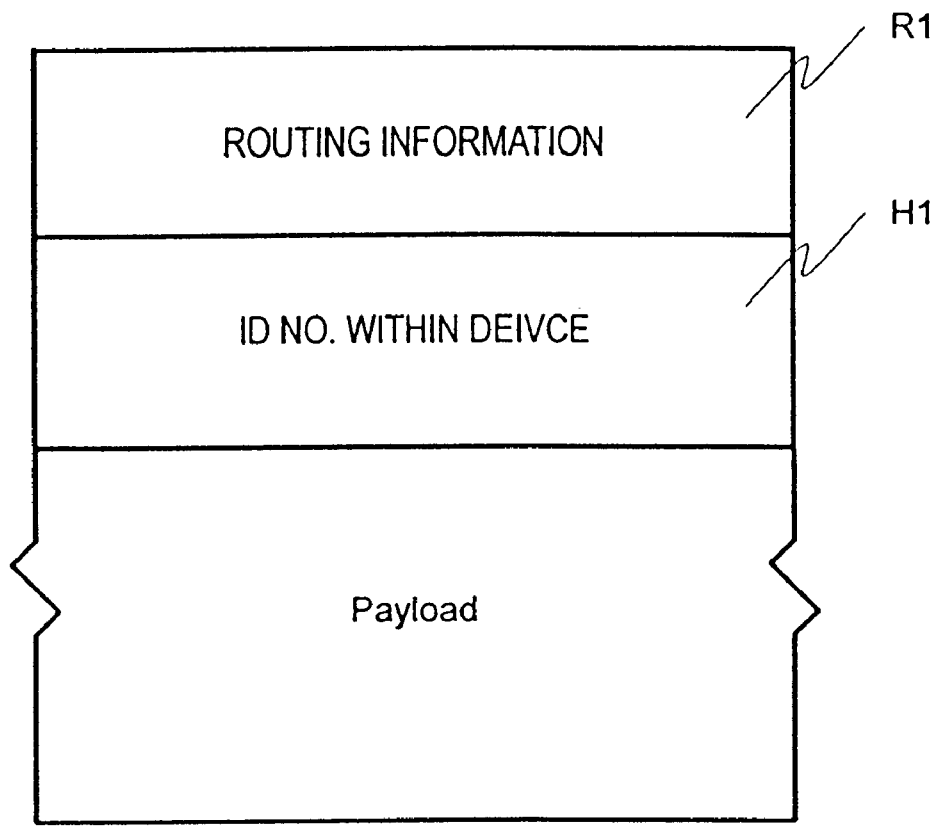
FIG. 6 is a view showing an ATM cell format within the device.

The ATM layer processing section 112-I on the input side comprises an ATM cell header conversion section 112-I-1 and an ATM cell header conversion table 112-I-2. In the ATM cell header conversion section 112-I-1, VPI/VCI information stored in a predetermined area of the ATM cell header on the input side is extracted, ATM cell header conversion table 112-I-2 is referred to, and an ATM cell header value is retrieved, that is, a cell identification number H1 within the device is changed and routing information R1 is added. In FIG. 6, an example of an ATM cell format within the device is shown.

The ATM cell header conversion table 112-I-2 consists of input cell header information H0 including VPI/VCI value registered therein, which is to be given to the ATM cell, cell identification number H1 within the device, which is to be given to the ATM cell within the device after a header conversion, and routing information R1. The ATM cell header conversion section 112-I-1 retrieves the ATM cell header conversion table 112-I-2 using (VPI, VCI) extracted from the ATM cell header as a retrieve key, and obtains the cell identification number H1 and routing information R1 within the device, thus converting the ATM cell header inputted to the ATM cell header within the device.

Figure 7:
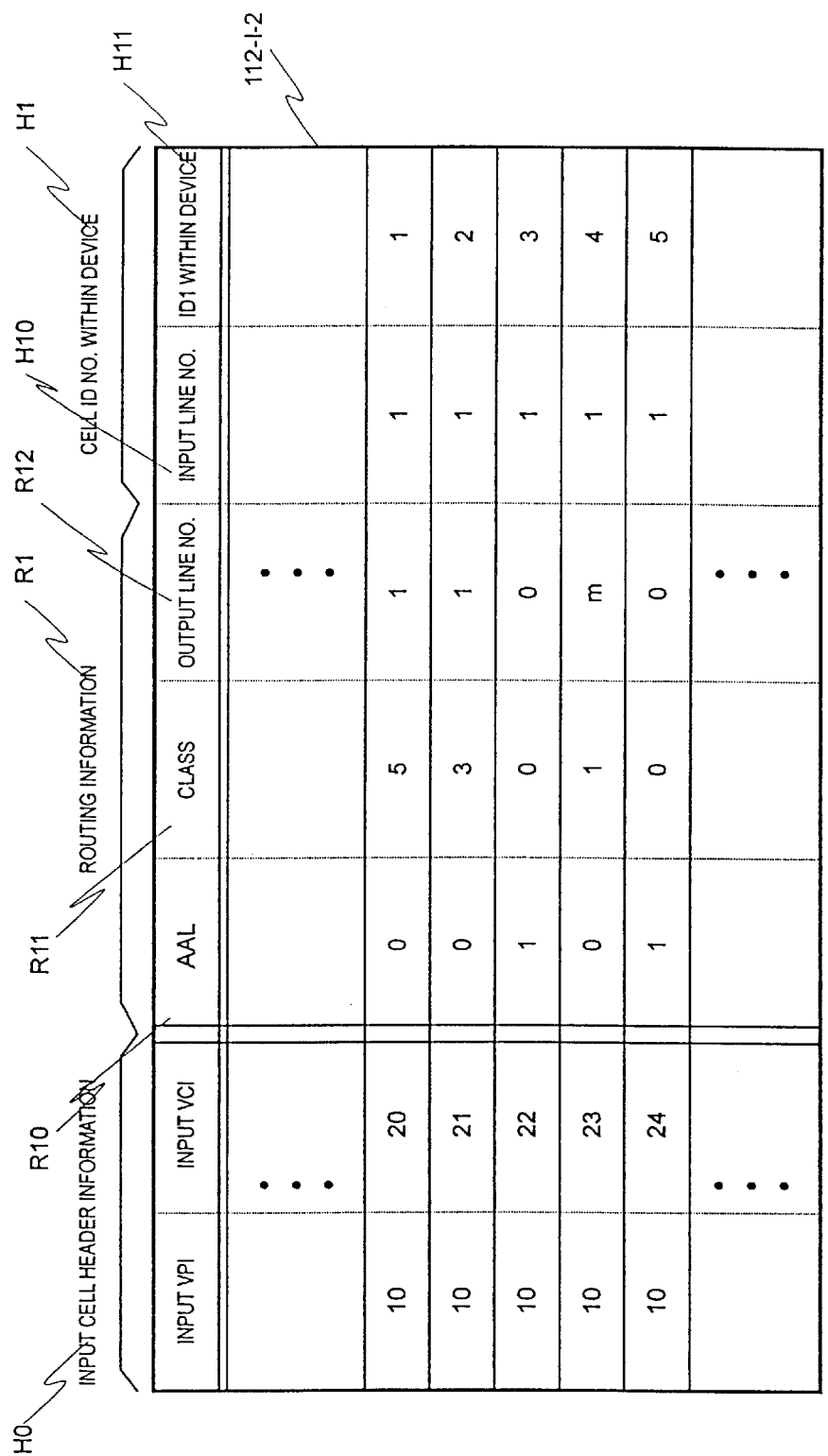
FIG. 7 is a view showing a constitution of an ATM cell header conversion table within an ATM layer processing section on an input side.

In FIG. 7, a constitution of the ATM cell header conversion table 112-I-2 is illustrated. The cell identification number H1 within the device consists of H10 that is an input line number and H11 that is ID1 within the device, and the routing information R1 consists of R10 (for the distinction of AAL type), R11 (for the distinction of class) and R12 (for the distinction of output line number). Hereupon, R10 is a flag for identifying whether the cell inputted is an AAL2 cell or an ATM cell cellularized by other AAL. For example, when the cell inputted is the AAL2 cell, R10 is expressed as "1", and when the cell inputted is the ATM cell cellularized by an AAL other than the AAL cell, R10 is expressed as "0". Moreover, R11 is a flag indicating a priority at the time when the ATM cell is transferred in the device. As shown in FIG. 7, for the connection designated by (VPI, VCI)=(10, 20), for example, an area taking the area of (VPI, VCI)=(10, 20) in the ATM cell header conversion table 112-I-2 is retrieved, and a header conversion is performed using H1=(1, 1) and R1=(0, 5, 1), which are registered so as to correspond to (VPI, VC1)=(10, 20), as a header within the device. The ATM cell header conversion table 112-I-2 may be constituted simply by a memory and a retrieve logic, or a memory having a retrieve function called content address memory (CAM) therein.

The input-side cell transfer control section 113-1 comprises an ATM cell demultiplexing section 113-I-1, an AAL2 DMX 113-I-2, an output control section 113-I-3, and an ATM cell multiplexing section 113-I-4. In the ATM cell demultiplexing section 113-I-1, R10 indicating AAL type information in the routing information R1 stored in a predetermined area in a header of the ATM cell which is transferred from the ATM layer processing section 112-1 is referred to, and the ATM cell of the AAL2 is transferred to the AAL2 DMX 113-I-2, and the ATM cells other than the ATM cell of the AAL2 are transferred to the ATM cell multiplexing section 113-I-4.

The AAL2 DMX 113-I-2 has a function to convert the AAL2 cell to the AAL2 partial fill cells. As shown in FIG. 24, when the AAL2 cell, in which, for example, four CPS packets are multiplexed and packed into one ATM cell, is inputted to the AAL2 DMX, the AAL2 is converted to the AAL2 partial fill cells in the AAL2 DMX 113-I-2, so that four ATM cells are outputted.

Figure 8:
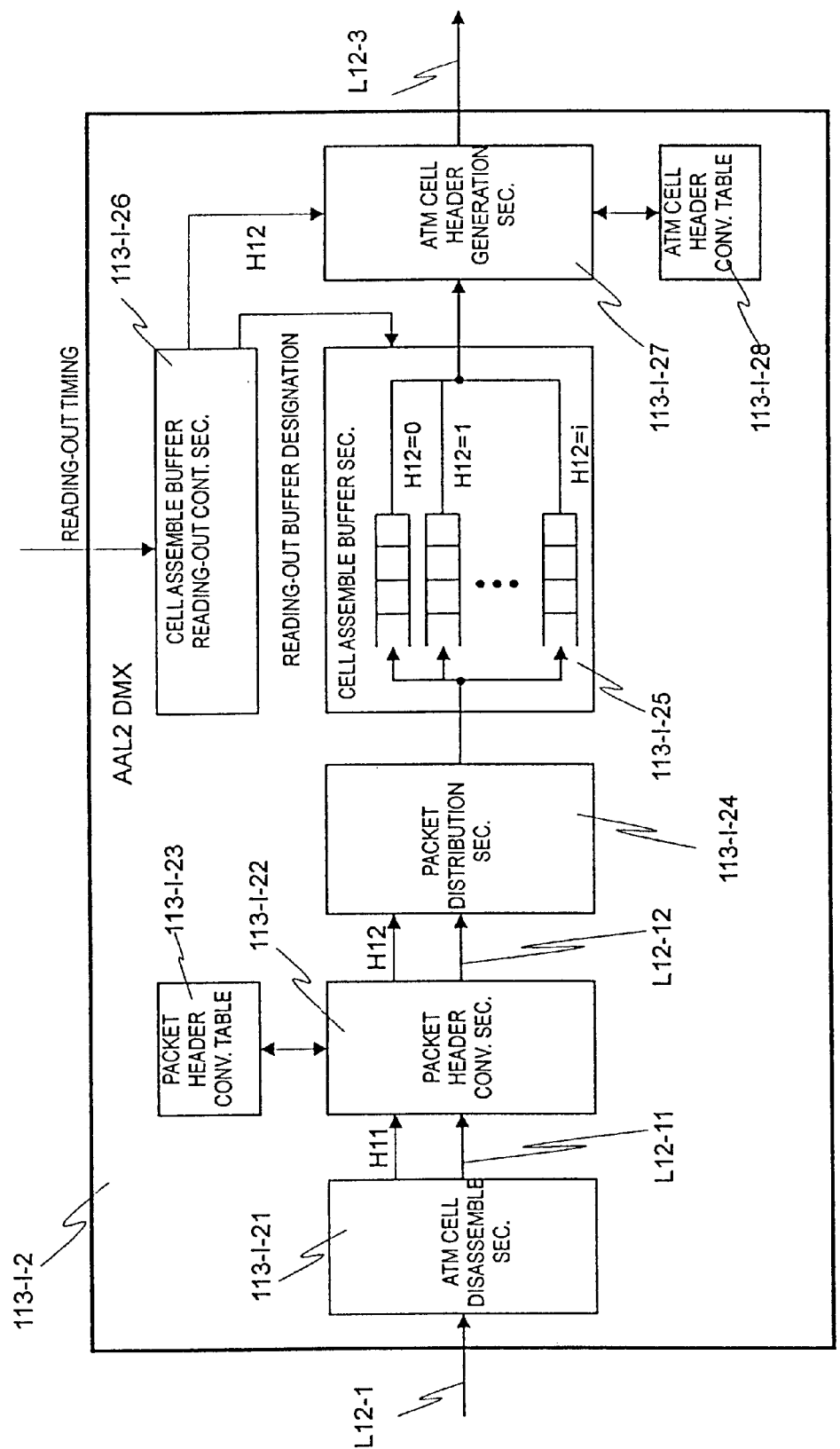
FIG. 8 is a view showing a constitution of a cell conversion section AAL2 DMX according to a first embodiment of the present invention.

In FIG. 8, a constitution of the cell conversion section AAL2 DMX according to a first embodiment is shown. In order to perform a conversion from the AAL2 cell to the AAL2 partial fill cells, as shown in FIG. 8, the AAL2 DMX 113-I-2 comprises an ATM cell disassemble section 113-I-21, a packet header conversion section 113-I-22, a packet header conversion table 113-I-23, a packet distribution section 113-I-24, an ATM cell assemble buffer section 113-I-25, a cell assemble buffer reading-out control section 113-I-26, an ATM cell header generation section 113-I-27 and an ATM cell header conversion table 113-I-28.

In the ATM cell disassemble section 113-I-21, the ATM cell is disassembled, and the CPS packets stored in the ATM cell payload are separated. Then, the separated CPS packets are transferred to the packet header conversion section 113-I-22. At the same time when the CPS packets are transferred, H11 (ID1 within the device) in the cell identification number within the device, which is given to the ATM cell header within the device is also transferred to the packet header conversion section 113-I-22. The packet header conversion section 113-I-22 refers to the packet header conversion table 113-I-23, and obtains a CPS packet header value h1 (CID within the device) to be presented to the CPS packet within the device, and a header value H12 (ID2 within the device) of the ATM cell into which the CPS packet is packed.

In FIG. 9, a constitution of the packet header conversion table within the AAL2 DMX is shown. As shown in FIG. 9, the packet header conversion table 113-I-23 has an area for registering H11 in a cell identification number H1 within the device (ID1 within the device) and an input CID value h0 of the CPS packet header (H11, h0), and an area (H12, h1) for registering H12 (ID2 within the device) which represents an identification number of the VC connection after the conversion and for registering the CPS packet header value h1 (CID within the device). The packet header conversion section 113-I-22 retrieves the packet header conversion table 113-I-23 using (H11, h0) as a retrieve key, similarly to the ATM cell header conversion 112-I-1, and obtains (H12, h1). The packet header conversion section 113-I-22 converts the CPS packet header to the packet header value h1, thus transferring the CPS packet to the packet distribution section 113-I-24.

In the packet distribution section 113-I-24, the VC connection within the device, which packs the CPS packet therein, is decided by H12, and the CPS packets are distributed to the cell assemble buffer section 113-I-25 prepared in each H12 (1D2 within the device). The CPS packets buffered by the cell assemble buffer section 113-I-25 are assembled to the AAL2 partial fill cell-by the cell assemble buffer reading-out control section 113-I-26, and the AAL2 partial fill cell is transferred to the ATM cell multiplexing section 113-I-4 according to reading-out timing generated by the output control section 113-I-3. At this time, in the ATM cell header generation section 113-I-27, the ATM cell header conversion table 113-I-28 is referred to, and the ATM cell headers R1 and H1 within the device are retrieved, so that the ATM cell header is generated.

Figure 10:
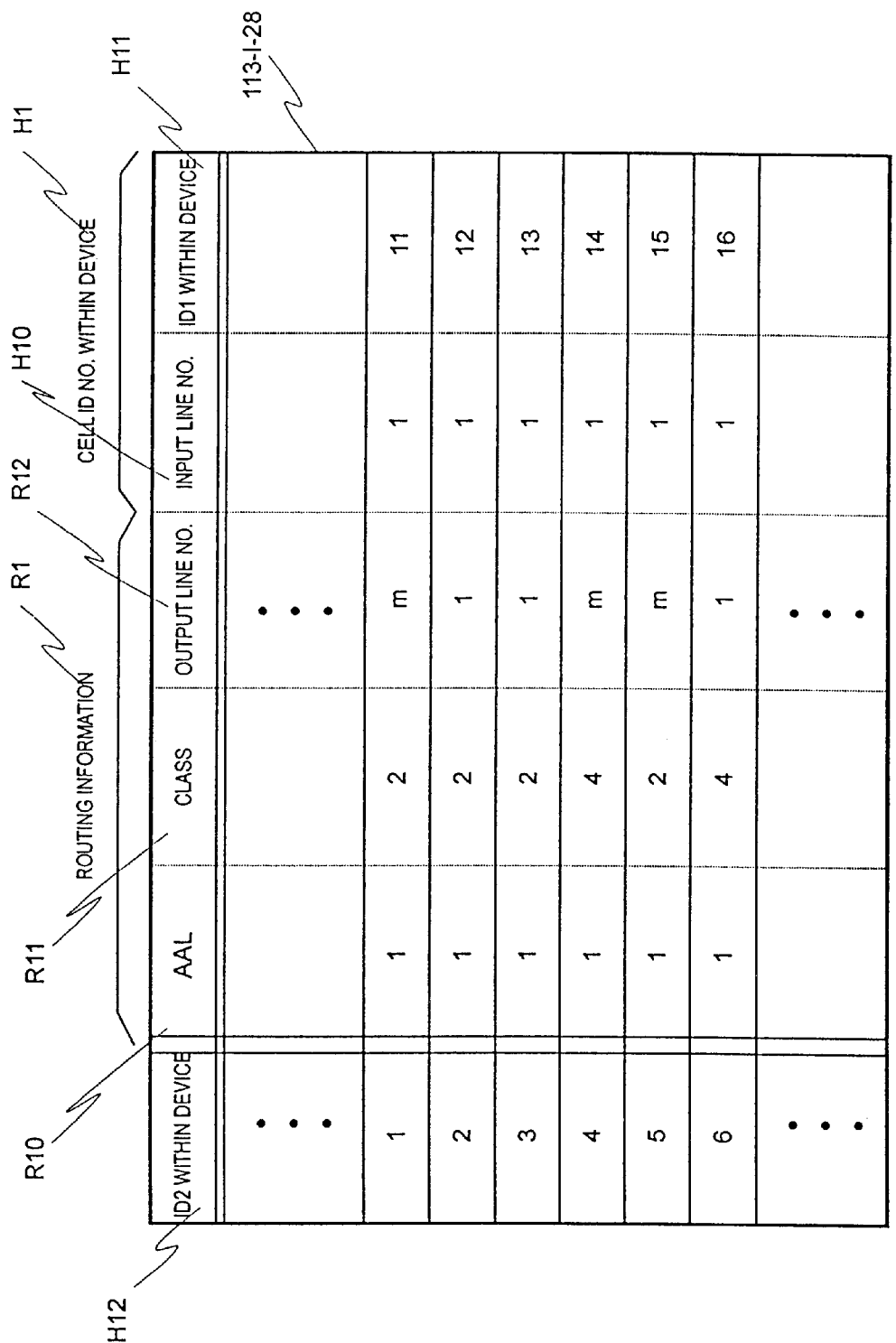
FIG. 10 is a view showing a constitution of an ATM cell header conversion table within the cell conversion section AAL2 DMX.

In FIG. 10, a constitution of the ATM cell header conversion table 113-I-28 is shown. The ATM cell header conversion table 113-I-28 has an area (ID2 within the device) for registering the cell header H12 which indicates an identification number of the VC connection and areas (R1 and H1) for registering the routing information R1 and the cell identification number H1 within the device.

Figure 11:
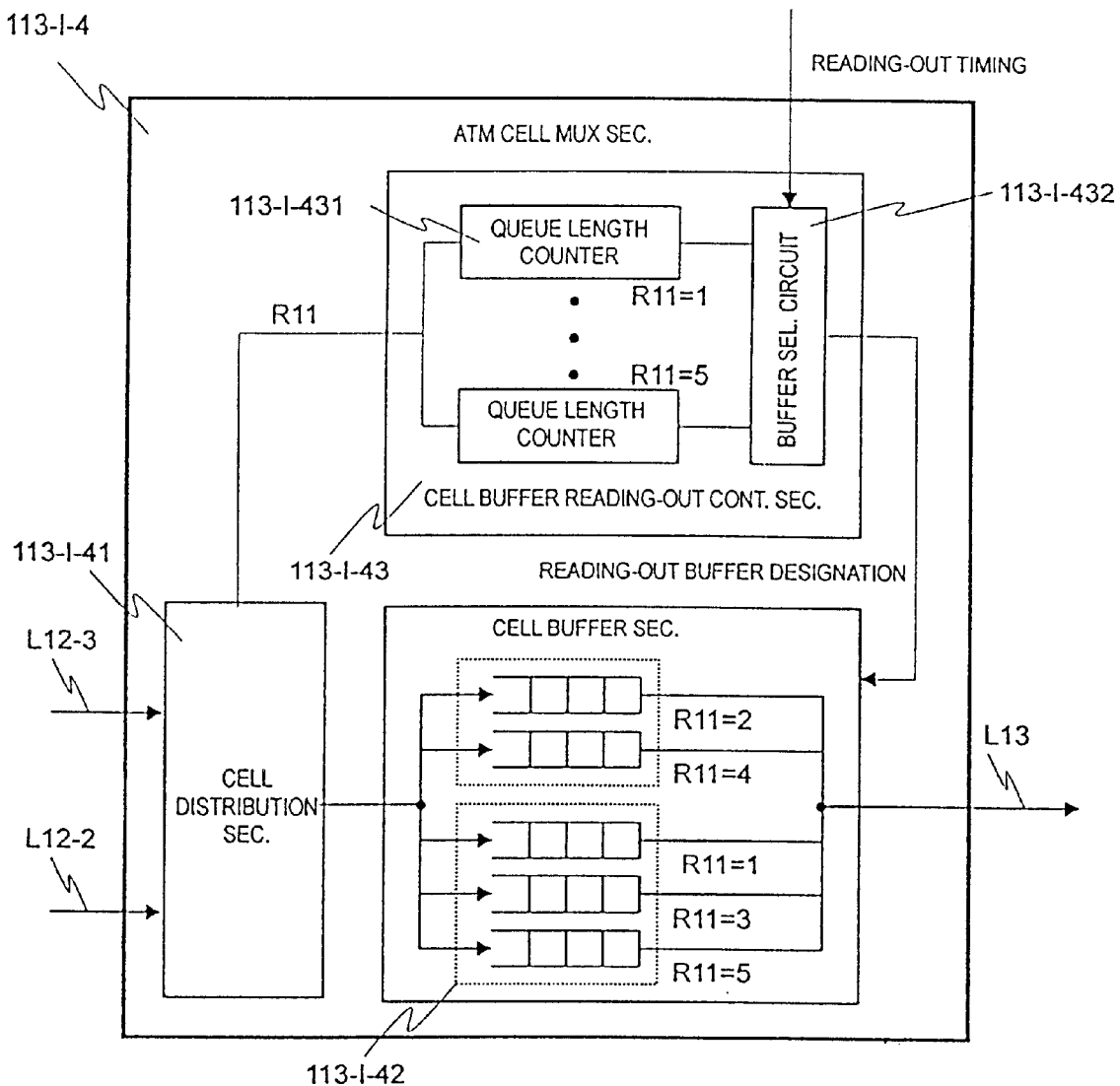
FIG. 11 is a view showing a constitution of an ATM cell multiplexing section on the input side.

In FIG. 11, a constitution of the input-side ATM cell multiplexing section is shown. The ATM cell multiplexing section 113-I-4 comprises a cell distribution section 113-I-41, a cell buffer section 113-I-42 and a cell buffer reading-out control section 113-I-43, as shown in FIG. 11. The cell distribution section 113-I-41 decides a class of the ATM cell inputted based on class information R11 contained in the routing information R1 which is stored in predetermined areas in the headers of the AAL2 partial fill cell transferred from the AAL2 DMX 113-I-2 and the ATM cell other than AAL2 cell transferred from the ATM cell demultiplexing section 113-I-1. The ATM cell is stored in the buffer of each of the cell buffer sections 113-I-42 prepared for corresponding classes. Moreover, the cell distribution section 113-I-41 presents the class information R11 to the cell buffer reading-out control section 113-I-43. The cell buffer reading-out control section 113-I-43 has a queue length counter 113-I-431 for controlling the queue length of the buffer of the cell buffer section 113-I-42 prepared for each class. Also, the cell buffer reading-out control section 113-I-43, when the ATM cell is inputted to the cell distribution section 113-I-41, increments the queue length counter corresponding to the class information R11 which is presented from the cell distribution section 113-I-41. The buffered ATM cell designates the buffer (class), in which the ATM cell is read out by the cell buffer reading-out control section 113-I-43, according to a reading-out timing designated by the output control section 113-I-3, and decrements the queue length counter 113-I-431 of the class. The ATM cell is read out from the buffer of each class in the cell buffer section 113-I-42, and transferred to the ATM switching section 120. At this time, a selection of the buffer class from which the ATM cell is read out is determined by the buffer selection circuit 113-I-432 in the cell buffer reading-out control section 113-I-43. In the buffer selection circuit 113-I-43, based on the information relating to the queue length counter 113-I-431 which manages the queue length of the cell buffer prepared for each class, the reading-out buffer is selected. As a method to select the reading-out buffer, a complete priority control or the like, which select a buffer having a low priority only when the queue length counter in the buffer exhibiting a high priority is 0, can be employed.

Next, a processing for the output-side ATM cell will be described.

Like the constitution of the output-side ATM line corresponding section shown in FIG. 5, the output-side cell transfer control section 113-O comprises an ATM cell demultiplexing section 113-O-1, an AAL2 MUX 113-O-2, an output control section 113-O-3 and an ATM cell multiplexing section 113-O-4.

Figure 12:
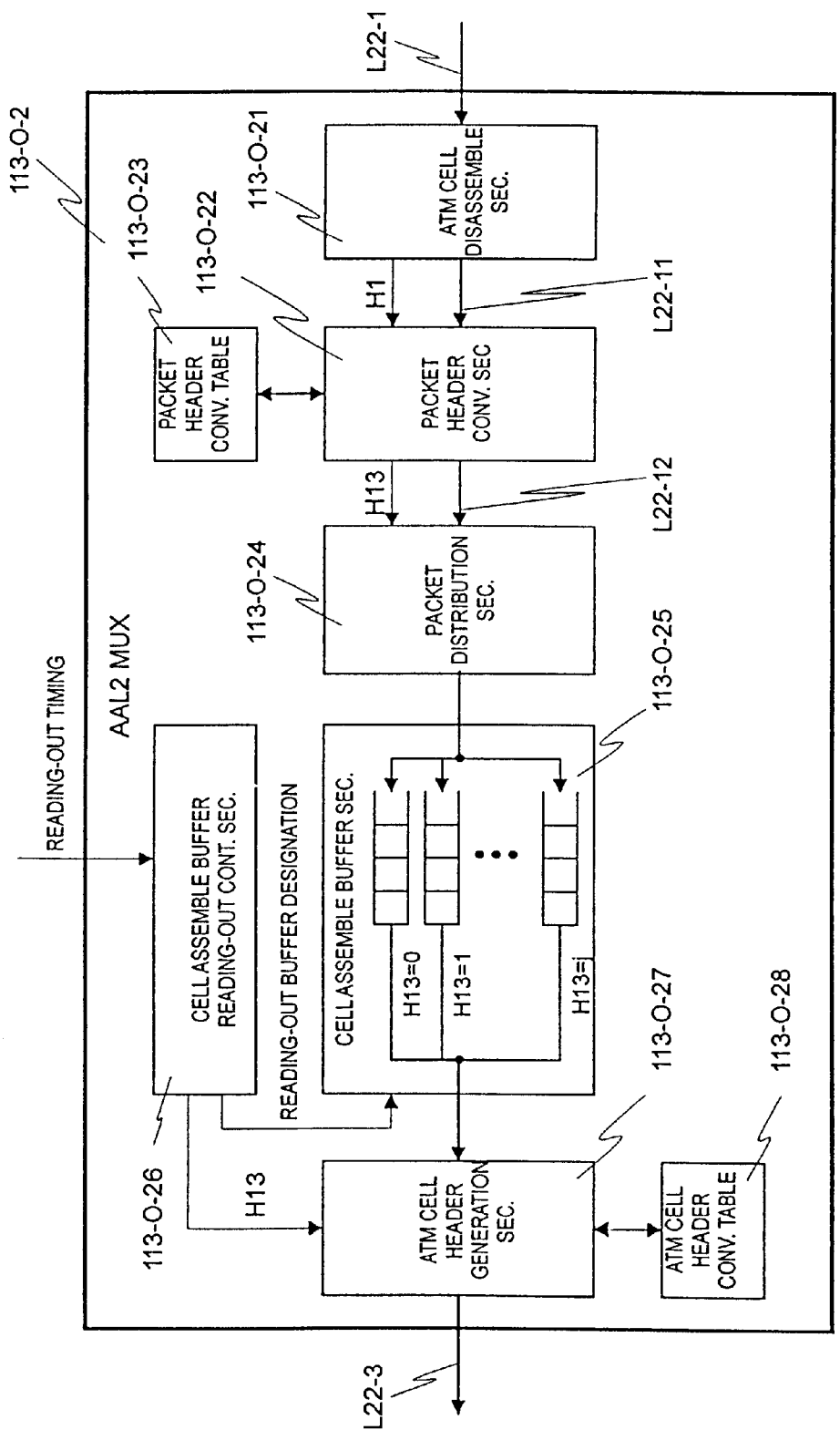
FIG. 12 is a view showing a constitution of a cell conversion section AAL2 MUX.

The ATM cell demultiplexing section 113-O-1 refers to R10 indicating AAL type information contained in the routing information R1 which is stored in a predetermined area in the ATM cell header transferred from the ATM switching section 120, and transfers the ATM cell of AAL2 to the AAL2 MUX 113-O-2, and at the same time transfers the ATM cell other than AAL2 to the ATM cell multiplexing section 113-O-4. The AAL2 MUX 113-O-2 multiplexes and packs the AAL2 partial fill cells to be multiplexed and packed into the same VC connection, and converts the AAL2 partial fill cells to the AAL2 cell In FIG. 12, a constitution of the cell conversion section AAL2 MUX is shown. As shown in FIG. 12, the AAL2 MUX 113-O-2 consists of the same components as those of the AAL2 DMX 113-I-2, principally. To be more specific, the AAL2 MUX 113-O-2 comprises an ATM cell disassemble section 113-O-21, a packet header conversion section 113-O-22, a packet header conversion table 113-O-23, a packet distribution section 113-O-24, a cell assemble buffer section 113-O-25, a cell assemble buffer reading-out control section 113-O-26, and ATM cell header generation section 113-O-27 and an ATM cell header conversion table 113-O-28.

The ATM cell disassemble section 113-O-21 disassembles the ATM cell, and separates the CPS packets stored in the ATM cell payload, thus transferring the CPS packets to the packet header conversion section 113-O-22. At this time, H1 (cell identification number within the device) indicating the cell identification number within the device which is presented in the ATM cell header is also transferred to the packet header conversion section 113-O-22 in addition to the CPS packets. The CPS packet header conversion section 113-O-22 refers to the CPS packet header conversion table 113-O-23, and obtains the CPS packet header value h2 (output CID) presented to the CPS packets on the transmission path and the header value H13 (ID3 within the device) that is an identification number of the VC connection in which the CPS packets are multiplexed and packed.

Figure 13:
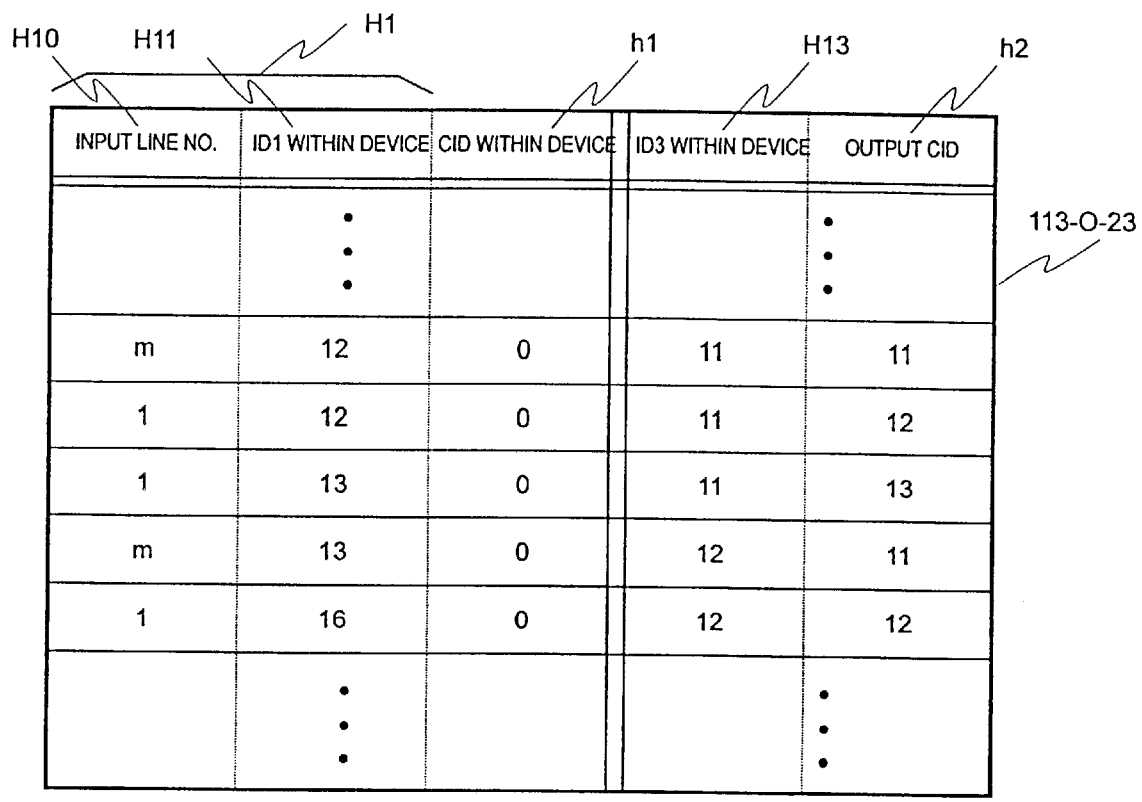
FIG. 13 is a view showing a constitution of a packet header conversion table within the cell conversion section AAL2 MUX.

In FIG. 13, a constitution of the packet header conversion table in the AAL2 MUX is shown. As shown in FIG. 13, the packet header conversion table 113-O-23 has an area (H1, h1) for registering the ATM cell header value H1 within the device (cell identification number within the device) and the CID value h1 (CID within the device) of the CPS packet header within the device, and an area (H13, h2) for registering H13 (D3 within the device) indicating the identification number of the VC connection after the conversion to the AAL2 cell and the header value h2 that is the CID value of the CPS packet header on the transmission path. The packet header conversion section 113-O-22 retrieves the packet header conversion table 113-O-23 using the area (H1, h1) as a retrieve key, and obtains the area (H13, h2). The packet header conversion section 113-O-22 converts the CPS packet header to h2 (output CID), and transfers it to the packet distribution section 113-O-24. The packet distribution section 113-O-24 distributes the CPS packets to the cell assemble buffer section 113-O-25 prepared for each H13 (OD3 within the device), and stores therein. The CPS packets buffered in the cell assemble buffer section 113-O-25 is assembled to the AAL2 cell by the cell assemble buffer reading-out control section 113-O-26, and the AAL2 cell is transferred to the ATM cell multiplexing section 113-O-4 according to a reading-out timing generated by the output control section 113-O-3. Moreover, the ATM cell header generation section 113-O-27 refers to the ATM cell header conversion table 113-O-28 to retrieve the ATM cell headers R1 and H1 within the device, and generates the ATM cell header.

In FIG. 14, a constitution of the ATM cell header conversion table 113-O-28 is shown. The ATM cell header conversion table 113-O-28 has an area for registering the header value H13 (ID3 within the device) which indicates the identification number of the VC connection, and an area (R1, H1) for registering the routing information R1 and the cell identification number H1 within the device.

Figure 15:
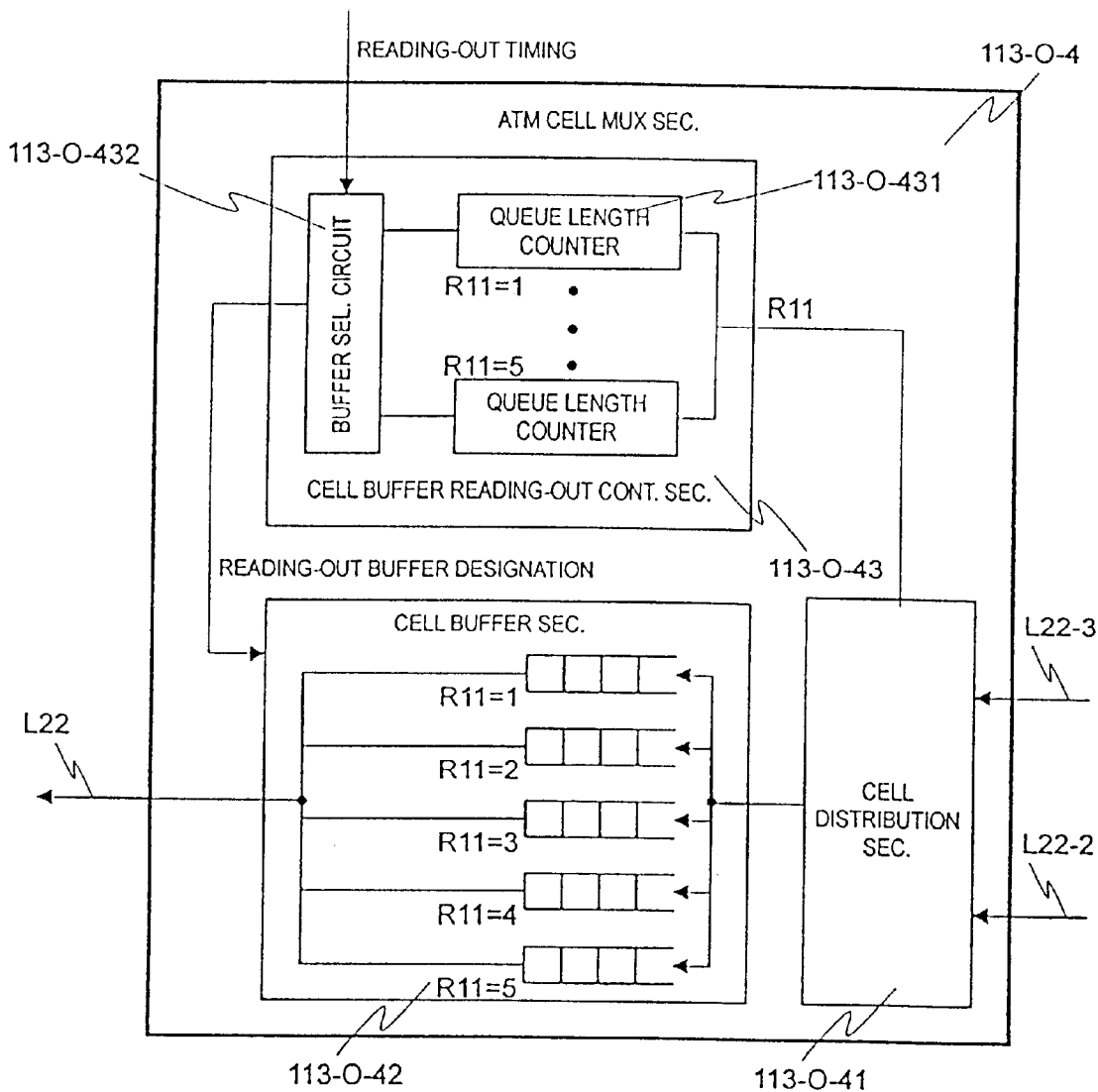
FIG. 15 is a view showing a constitution of an ATM cell multiplexing section on an output side.

In FIG. 15, a constitution of the output-side ATM cell multiplexing section is shown. The ATM cell multiplexing section 13-O-4 comprises a cell distribution section 113-O-41, a cell buffer section 113-O-42 and a cell buffer reading-out control section 113-O-43. The cell distribution section 113-O-41 decides a class of the inputted ATM cell based on class information R1 contained in the routing information R1 which is stored in a predetermined area in the header of the ATM cell other than the AAL2 cell transferred from the AAL2 MUX 113-O-2 and the AAL2 cell transferred from the ATM cell demultiplexing section 113-O-1. The ATM cell is stored in each of the buffers in the cell buffer section 113-O-42 prepared for each class. Moreover, the cell distribution section 113-O-41 presents the class information R11 to the cell buffer. reading-out control section 113-O-43. The cell buffer reading-out control section 113-O-43 has a queue length counter 113-O-431 for controlling the queue length of each buffer in the cell buffer section 113-O-42 prepared for each class. Also, the cell buffer reading-out control section 113-O-43, when the ATM cell is inputted to the cell distribution section 113-O-41, increments the queue length counter corresponding to the class information R11 which is presented from the cell distribution section 113-O-41.

The buffered ATM cell designates a buffer (class) for reading out the ATM cell by the cell buffer reading-out control section 13-O-43, according to a reading-out timing designated by the output control section 113-I-O, and decrements the queue length counter 113-O-431 corresponding to the class designated. The ATM cell is read out from the buffer of each class in the cell buffer section 113-O-42, and transferred to the output-side ATM layer processing section 112-O. At this time, a selection of the buffer class from which the ATM cell is read out is determined by the buffer selection circuit 113-O-432 in the cell buffer reading-out control section 113-O-43. In the buffer selection circuit 113-O-43, based on the information relating to the queue length counter 113-O-431 which controls the queue length of the cell buffer prepared for each class, the reading-out buffer is selected. As a method to select the reading-out buffer, for example, a complete priority control or the like, which select a buffer having a low priority only when the queue length counter in the buffer exhibiting a high priority is 0, can be employed.

As shown in FIG. 5, the output-side ATM layer processing section 112-O comprises an ATM cell header conversion section 112-O-1 and an ATM cell header conversion table 112-O-2. The ATM cell header conversion section 112-O-1 extracts a cell identification number H1 within the device, which is stored in a predetermined area of the header within the device, which is transferred from the output-side cell transfer control section 113-O. The ATM cell header conversion section 112-O-1 refers to the ATM cell header conversion table 112-O-2, and retrieves a VPI/VCI value to be presented to the ATM cell on the transmission path.

In FIG. 16, a constitution of the ATM cell header conversion table in the output-side ATM layer processing section is shown. The ATM cell header conversion table 112-O-2 has an area for the cell identification number H1 within the device, and an area for the output cell header information H2 (VPI, VCI) indicating VPI/VCI on the transmission path, as shown in FIG. 16. The ATM cell header conversion section 112-O-1 retrieves the ATM cell header conversion table 112-O-2 using H1 extracted from the ATM cell header within the device as a retrieve key, and retrieves the VPI/VCI on the transmission path, thus presenting it to the ATM cell header.

Hereupon, by the ATM relay exchanging device constituted by the foregoing functions, an operation on the transfer control of the ATM cell which is cellularized by an AAL2 partial fill cell and an AAL other than AAL2 will be described.

In FIG. 4, it is assumed that a line speed of the line L12 from the ATM layer processing section 112-I to the cell transfer control section 113-I is v1, and a line speed of the line L13 from the cell transfer control section 113-I to the ATM switching section 120 is v2. Hereupon, since the AAL2 DMX 113-I-2 converts the AAL2 cell to the AAL2 partial fill cells, a constitution in which v1<=v2 is established is obtained, for example, v1=150 Mbit/s and v2=600 Mbit/s. When the AAL2 cell is converted to the AAL2 partial fill cell by the AAL2 DMX 113-I-2, the number of the ATM cells after the conversion increases significantly compared to that before the conversion. Moreover, depending on a difference of the packet length of one CPS packet, the number of the ATM cells after the conversion varies. For example, when it is considered that the minimum length of the CPS packet is 4 Bytes, the number of ATM cells after the conversion becomes 12 times at maximum in the event that one ATM cell is 48 Bytes. For this reason, if no countermeasure is taken, a transfer quality of the ATM cell cellularized by other AALs may be deteriorated by converting the AAL2 cell to the AAL2 partial fill cell.

In FIG. 17, an example of the relation between the sort of the ATM cell and the quality class is shown. When a competition of the reading-out of the ATM cells occurs in the ATM cell multiplexing section 113-I-4, a priority order is presented in the order of, for example, a top priority cell other than the AAL2>a priority cell of the AAL2>a priority cell other than the AAL2>a non-priority cell of the AAL2>a non-priority cell other than the AAL2 as shown in FIG. 17, and the reading-out of the ATM cell is controlled, whereby an influence of the AAL2 partial fill cell in the ATM relay exchanging device can be suppressed to a minimum.

Figure 18:
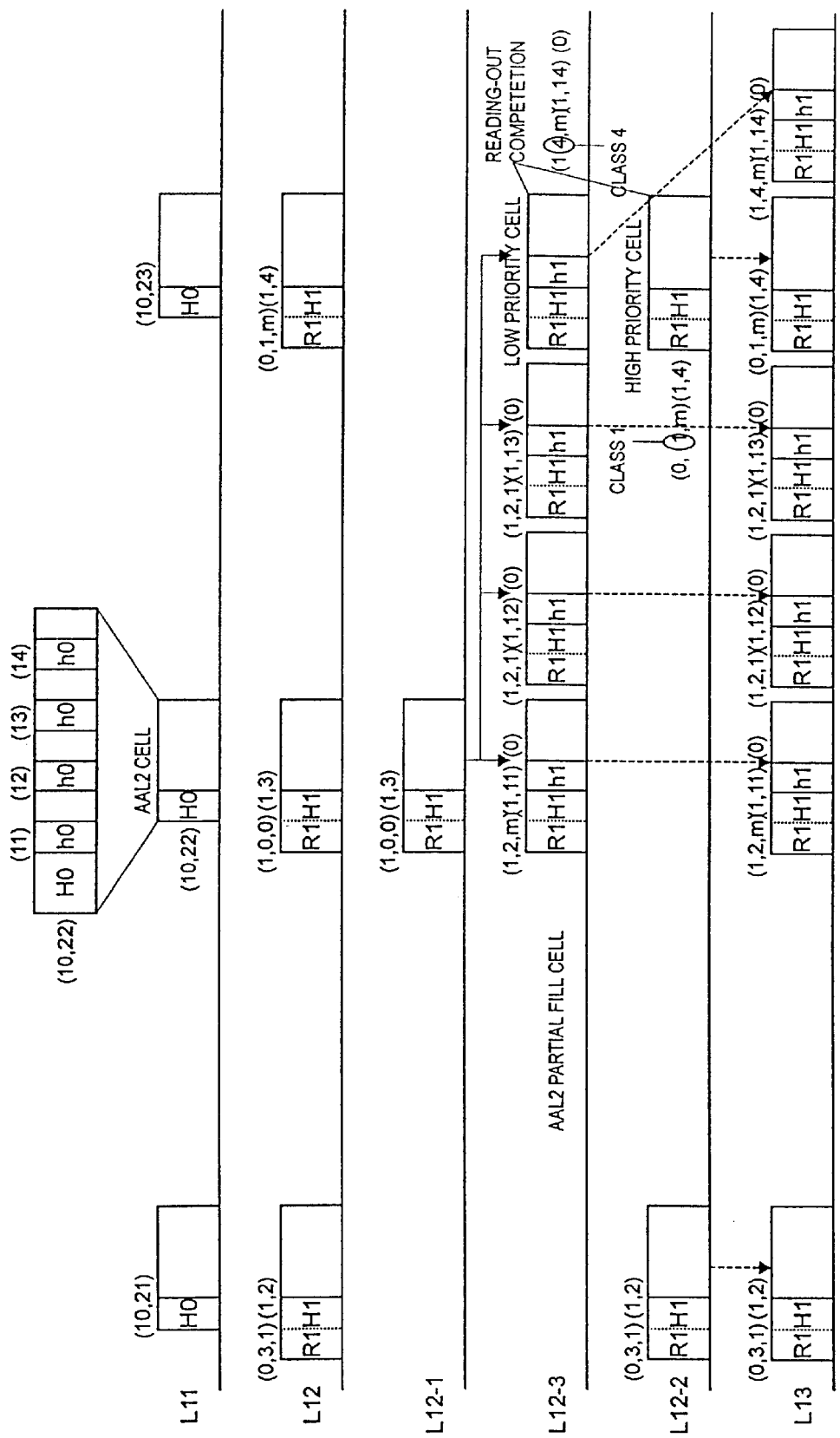
FIG. 18 is a view for exemplifying a transfer of an ATM cell in an ATM line corresponding section on the input side.
Figure 19:
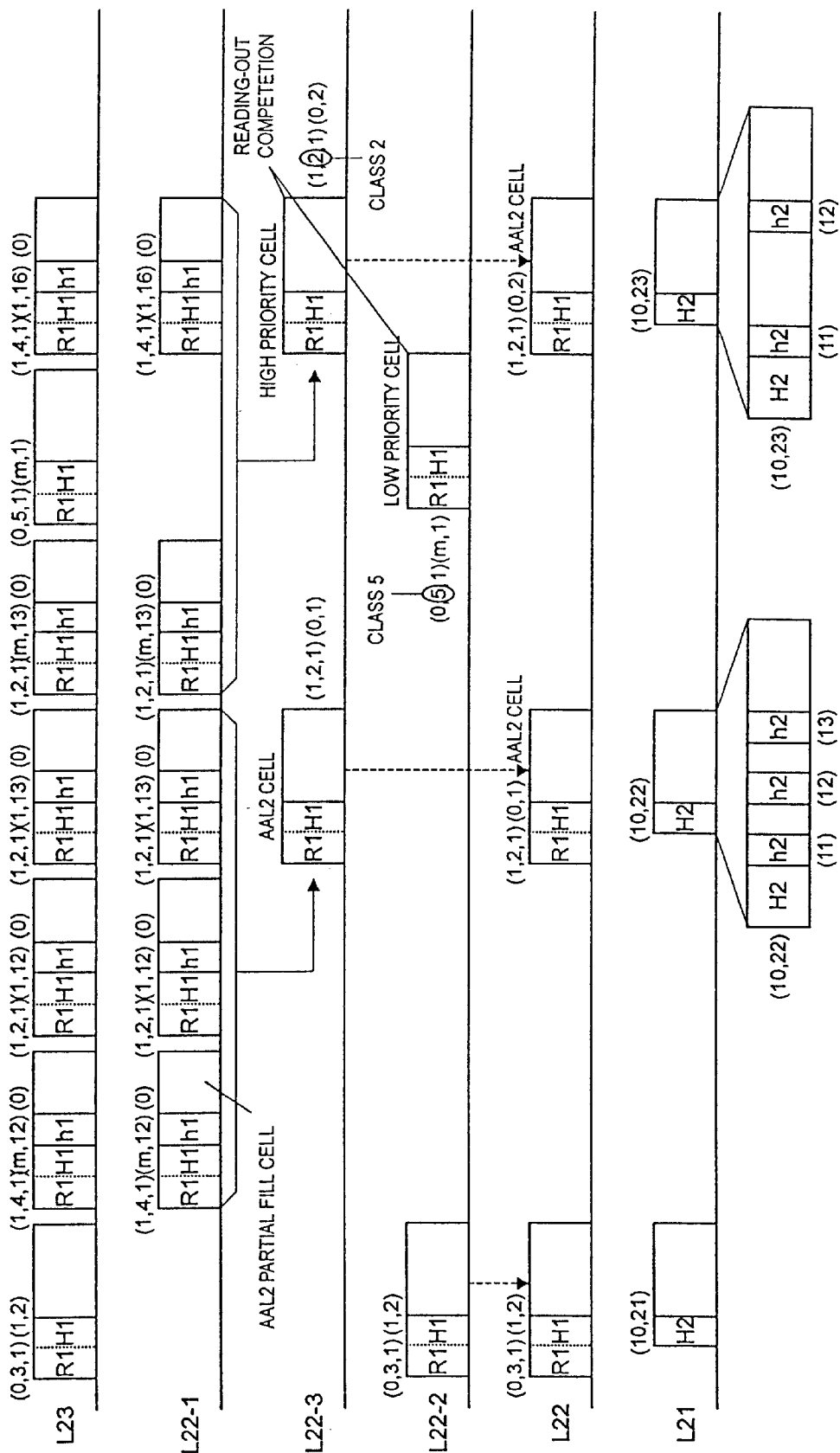
FIG. 19 is a view for exemplifying a transfer of an ATM cell in an ATM line corresponding section on the output side.

Next, an operation example of the input and output-side ATM line corresponding sections 110-1 to 110-m will be shown concretely. FIG. 18 shows an explanatory view of an ATM cell transfer example in the input-side line corresponding section, and FIG. 19 shows an explanatory view of an ATM cell transfer example in the output-side line corresponding section.

As shown in FIG. 18, as an example, it is assumed that ATM cells of (VPI, VCI)=(10, 21), (VPI, VCI)=(10, 22) and (VPI, VCI)=(10, 23) are transferred from the transmission path to the ATM layer processing section 112-I. Hereupon, the second ATM cell of (VPI, VCI)=(10, 22) is an AAL2 cell, and four CPS packets are multiplexed and packed into one ATM cell. The CPS packets of CID 11, 12, 13 and 14 arrive. With regard to the ATM cell arrived, a conversion processing for the ATM cell header is performed by the ATM layer processing section 112-I, and the ATM cell is transferred to the cell transfer control section 113-I. At this time, in the ATM cell header conversion section 112-I-1, the ATM cell header conversion table 112-I-2 is retrieved using the (VPI, VCI) value of the ATM cells inputted as a retrieve key, and the routing information R1 to be presented to each ATM cell and the cell identification number H1 within the device are obtained. In this example, the conversion to a value designated by the ATM cell header conversion table 112-I-2 shown in FIG. 7 is performed. The first ATM cell header of (VPI, VCI)=(10, 21) is converted to (R1, H1)=((0, 3, 1), (1, 2)), the second ATM cell header is converted to (R1, H1)=((1, 0, 0), (1, 3)), and the third ATM cell header is converted to (R, H1)=((0, 1, m), (1, 4)). The ATM cell demultiplexing section 113-I-1 decides by a value of R10 indicating the AAL information in the routing information R1 whether or not the ATM cell transferred to the cell transfer control section 113-I is an AAL2 cell. If the ATM cell is the AAL2 cell, the ATM cell is transferred to the AAL2 DMX 113-I-2, and if the ATM cell is a cell other than the AAL2, the ATM cell is transferred to the ATM cell multiplexing section 113-I-4. In this example, since R10 of the second ATM cell is "1", it is decided that the ATM cell is the AAL2, and the ATM cell is transferred to the AAL2 DMX 113-I-2. Since R10 of the first and third ATM cells is "0", the ATM cell is transferred to the ATM cell multiplexing section 113-I-4.

The second ATM cell transferred to the AAL2 DMX 113-I-2 is converted from the AAL2 cell to the AAL2 partial fill cell, and converted to the routing information R1, the identification number H1 within the device, and the CPS packet header value hi, which are designated by the packet header conversion table 113-I-23 (see FIG. 9) and the ATM cell header conversion table 113-I-28 (see FIG. 10). In the example shown here, the four CPS packets which are multiplexed and packed into the second AAL2 cell are converted-to the AAL2 partial fill cell. The respective ATM cell header and the CPS packet header value are converted to (R1, H1, h1)=((1, 2, m), (1, 11), (0)), ((1, 2, 1), (1, 12,), (0)), ((1, 2, 1), (1, 13), (0)), (1, 4, m) (1, 14), (0))

The ATM cell other than AAL2 cell transferred from the ATM cell demultiplexing section 113-I-1 and the AAL2 partial fill cell transferred from the AAL2 DMX 113-I-2 are multiplexed and packed by the ATM cell multiplexing section 113-I-4. At this time, in the event that a reading-out competition occurs, the reading-out control is performed according to the priority order for the ATM cell. In the example shown here, the reading-out of the AAL2 partial fill cell (R1, H1)=((1, 4, m), (1, 14)) competes with the reading-out of the ATM cell (R, H1)=(=(0, 1, m), (1, 4)). When the reading-out competition occurs, the reading-out control is performed according to a value of R11 indicating a class in the routing information. Hereupon, since R11 of the AAL2 partial fill cell is "4" and R11 of the ATM cell is "1", the ATM cell is read out preferentially, and the ATM cell is transferred to the ATM switching section 120. The AAL2 partial fill cell is read out afterward, and transferred to the ATM switching section 120.

Next, an example of a transfer operation of the ATM cell in the output-side ATM line corresponding section will be described.

Like an example of a transfer of the ATM cell in the output-side ATM line corresponding section shown in FIG. 19, the ATM cell switched by the ATM switching section 120 shall be transferred to the output-side cell transfer control section 113-O. In the example shown here, the ATM cells indicated by the identification numbers within the device H1=(1, 2), (m, 12), (1, 12), (1, 13), (m, 13), (in, 1) and (1, 16) shall be transferred to the output-side cell transfer control section 113-O sequentially. Hereupon, the ATM cells indicated by H1=(m, 12), (1, 12), (1, 13), (m, 13) and (1, 16) shall be the AAL2 partial fill cell.

With the ATM cell transferred to the output-side cell transfer control section 113-O, it is decided by a value of R10 showing AAL information in the routing information R1 whether or not the ATM cell is the AAL2 partial fill cell. If the ATM cell is the AAL2 partial fill cell, the ATM cell is transferred to the AAL2 MUX 113-O-2. If the ATM cell is not the AAL2 partial fill cell, the ATM cell is transferred to the ATM cell multiplexing section 113-O-4. In the example shown here, since R10 of the second to fifth ATM cells and the seventh ATM cell is "1", it is decided that the ATM cell is the AAL2 partial fill cell, and the ATM cell is transferred to the AAL2 MUX 113-O-2. Since R10 of the first and sixth ATM cells is "0", the ATM cell is transferred to the ATM cell multiplexing section 113-O-4.

The AAL2 partial fill cell transferred to the AAL2 MUX 113-O-2 is converted to the AAL2 cell, and is converted to the routing information R1, the identification number H1 and the output CPS packet header value h2, which are designated by the packet header conversion table 113-O-23 (see FIG. 13) in the AAL2 MUX 113-O-2 and the ATM cell header conversion table 113-O-28 (see FIG. 14). In the example shown here, the second, third and fourth AAL2 partial fill cells are multiplexed and packed into one AAL2 cell, and transferred to the ATM cell multiplexing section 113-O-4 after being presented with the ATM cell header of (1, H1)=((1, 2, 1), (0, 1)).

The ATM cell other than the AAL2 cell transferred from the ATM cell demultiplexing section 113-O-1, and the AAL2 cell transferred from the AAL2 MUX 113-O-2 are multiplexed and packed by the ATM cell multiplexing section 113-O-4. At this time, in the event that a reading-out competition occurs, the reading-out control is performed according to the priority order for the ATM cell. In this example shown here, the reading-out of the AAL2 cell (R1, H1)=((1, 2, 1), (0, 2)) competes with the reading-out of the ATM cell (R1, H1)=((0, 5, 1), (m, 1)). When the reading-out competition occurs, the reading-out control is performed according to a value of R11 indicating a class in the routing information. Hereupon, since R11 of the AAL2 cell is "2" and R11 of the ATM cell is "5", the ATM cell is read out preferentially, and the ATM cell is transferred to the ATM layer processing section 112-O.

In the ATM layer processing section 112-O, an output (VPI, VCI) number H2 registered in the ATM cell header conversion table 112-O-2 (see FIG. 16) is obtained using the identification number of the ATM cell within the device as a retrieve key, which is transferred from the ATM cell header conversion section 112-O-1, and an ATM cell header conversion is performed. In this example shown here, the ATM cell header of H1=(1, 2) is converted to H2=(10, 21), the ATM cell header of H1=(0, 1) is converted to H2=(10, 22), and the ATM cell header of H1=(0, 2) is converted to H2=(10, 23). The ATM cells after having been subjected to the cell header conversion are transferred to the transmission path.

(2) Second Embodiment

In the foregoing descriptions, the case in which the class control is performed only by the ATM cell multiplexing section 113-I-4 in the input-side ATM line corresponding section was described. As another embodiment, a case in which the AAL2 DMX 113-I-2-2 of the input-side ATM line corresponding section is equipped with will be described.

Figure 20:
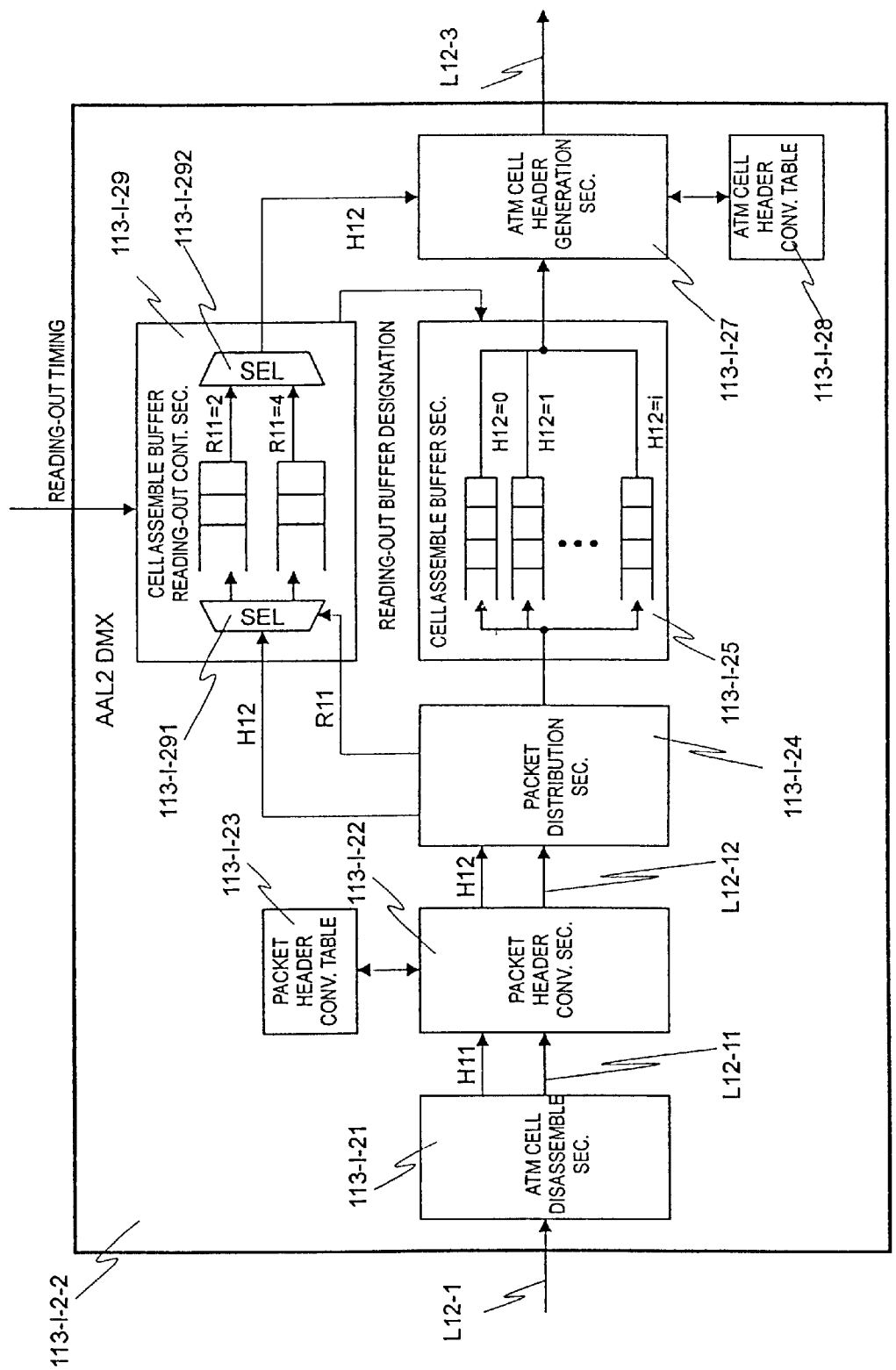
FIG. 20 is a view showing a constitution of a cell conversion section AAL2 DMX according to a second embodiment of the present invention.

In FIG. 20, a constitution of an AAL2 DMX 113-I-2-2 of a second embodiment of an ATM relay exchanging device according to the present invention is shown.

In order to convert the AAL2 cell to the AAL2 partial fill cell, the AAL2 DMX 113-I-2-2 comprises an ATM cell disassemble section 113-I-21, a packet header conversion section 113-I-22, a packet header conversion table 113-I-23, a packet distribution section 113-I-24, an ATM cell assemble buffer section 113-I-25, a cell assemble buffer reading-out control section 113-I-29, an ATM cell header generation section 113-I-27 and an ATM cell header conversion table 113-I-28.

Functions of components other than the cell assemble buffer reading-out control section 113-I-29 are the same as those of the first embodiment. The cell assemble buffer reading-out control section 113-I-29 has a logical queue for each class, which stores ID2 (H12) information within the device, the ID2 (H12) information being the identification number within the device for the CPS packets to be stored in the cell assemble buffer section 113-I-25. Moreover, the cell assemble buffer reading-out control section 113-I-29 comprises a selector SEL 113-I-291 for deciding a logical queue of a class where the ID2 (H12) within the device is stored, and a selector SEL 113-I-292 for deciding a logical queue of a class from which the ID2 (H12) within the device is read out.

In the cell assemble buffer reading-out control section 113-I-29, a buffer among the ATM cell assemble buffer sections: 113-I-25, from which the ATM cell is read out, is decided every the reading-out timing generated by the output control section 113-I-3. At this time, in the example shown in FIG. 20, by reading out the ID2 (H12) information within the device.preferentially from the logical queue of R11=2, the CPS packet of the class designated by R11=2 is converted to an AAL2 partial fill cell in preference to the CPS packet of the class designated by the R11=4, and the CPS packet can be transferred to the ATM cell multiplexing section 113-I-4.

Next, an example of an operation of a transfer of the ATM cell in the second embodiment will be described.

Figure 21:
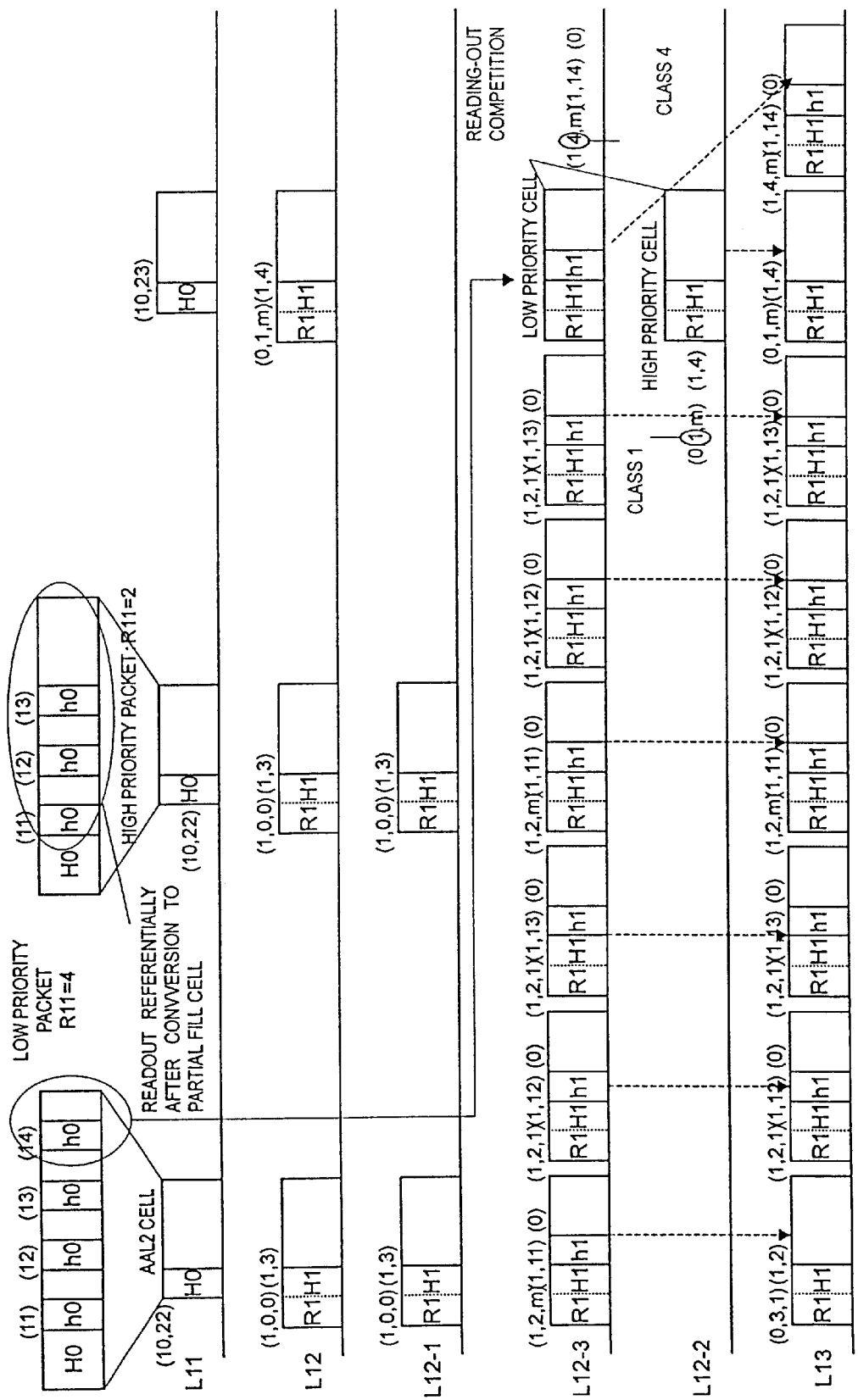
FIG. 21 is a view for exemplifying a transfer of an ATM cell in an ATM line corresponding section on the input side according to the second embodiment of the present invention.
Figure 22:
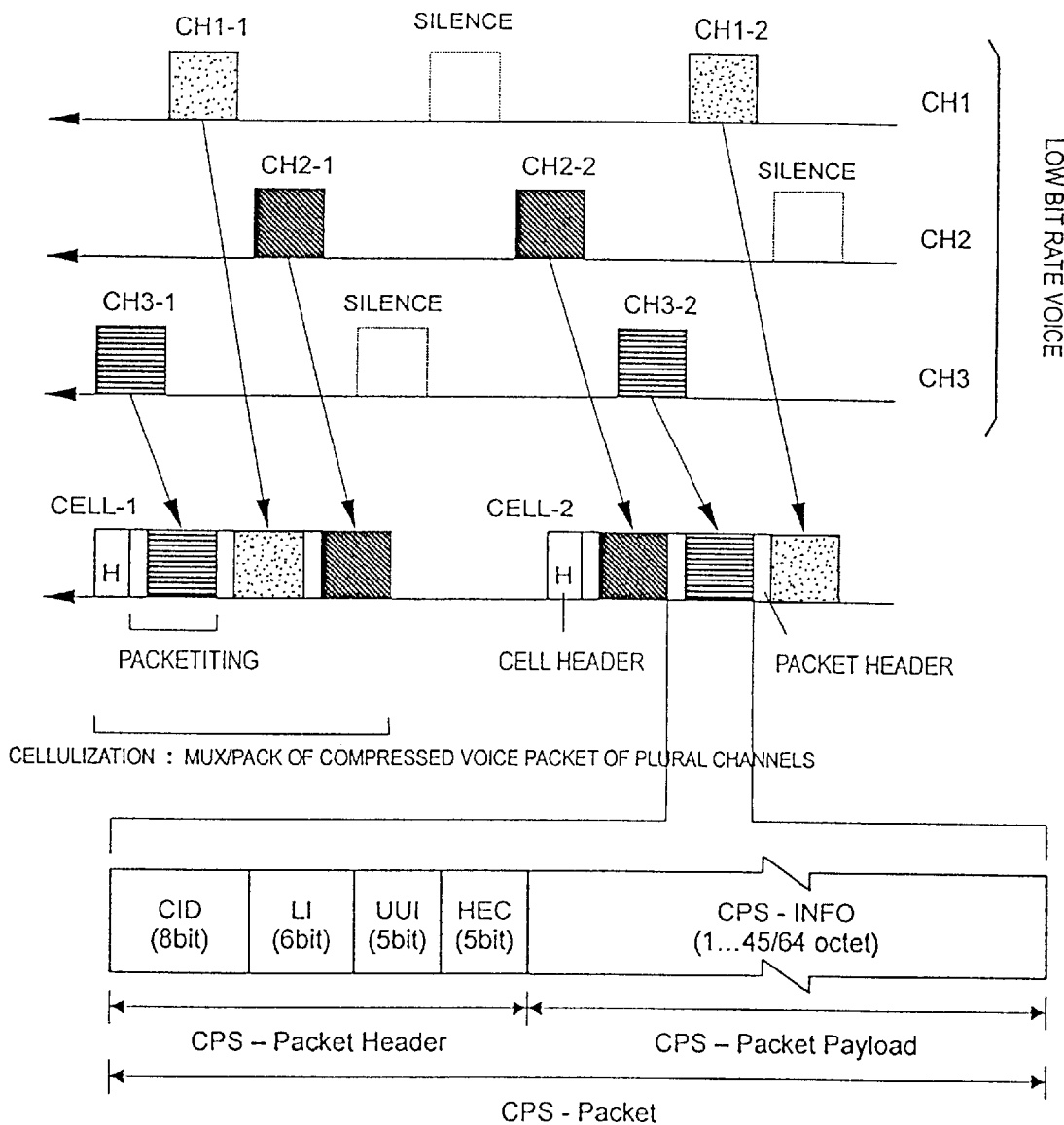
FIG. 22 is a view for explaining a method to cellularize an AAL2 cell.
Figure 23:
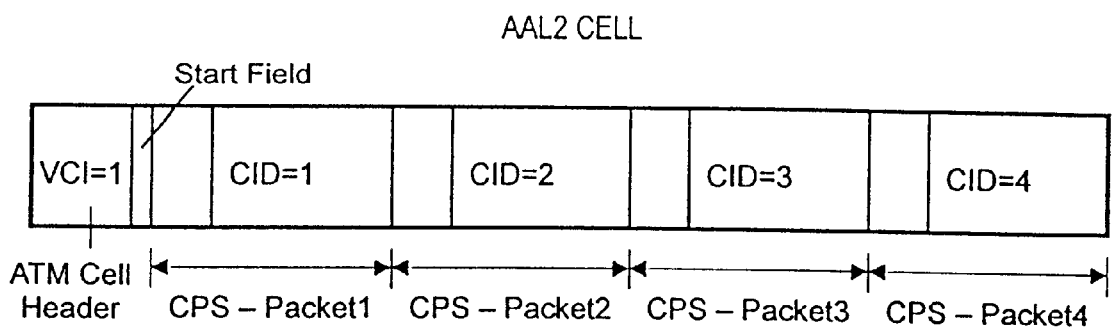
FIG. 23 is a view for explaining a conversion from an AAL2 cell to AAL2 partial fill cells.
Figure 23:
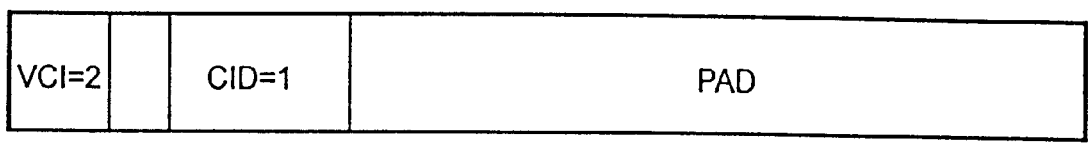
Figure 23:
Figure 23:
Figure 23:
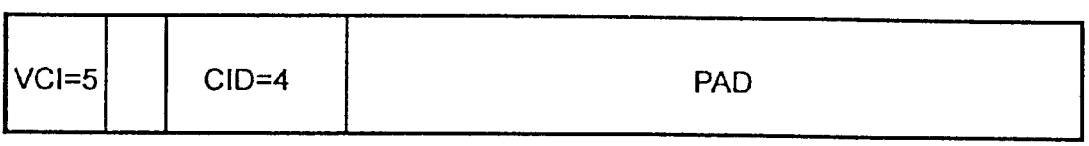

An explanatory view of an example of an input transfer according to the second embodiment is shown in FIG. 21. As shown in FIG. 21, it is assumed that ATM cells of (VPI, VCI)=(10, 22), (VPI, VCI)=(10, 22) and (VPI, VCI)=(10, 23) are transferred from the transmission path to the ATM layer processing section 112-I. Hereupon, the first ATM cell of (VPI, VCID=(10, 22) is an AAL2 cell, and four CPS packets are multiplexed and packed into one ATM cell. The CPS packets of CID=11, 12, 13 and 14 arrive. Also the second ATM cell of (VPI, VCI)=(10, 22) is an AAL2 cell. The three CPS packets are multiplexed and packed into one ATM cell. The CPS packets of CID=11, 12 and 13 arrive. With regard to the ATM cells arrived, a conversion processing for the ATM cell header is performed by the ATM layer processing section 112-I, and the ATM cells are transferred to the cell transfer control section 113-I. At this time, in the ATM cell header conversion section 112-I-1, the ATM cell header conversion table 112-I-2 is retrieved using the (VPI, VCI) value of the ATM cells inputted as a retrieve key, and the routing information R1 to be presented to each ATM cell and the cell identification number H1 within the device are obtained. In this example, the conversion to a value designated by the ATM cell header conversion table 112-I-2 shown in FIG. 7 is performed. The first ATM cell header of (VPI, VCI)=(10, 22) is converted to (R1, H1)=((1, 0, 0), (1, 3)), the second ATM cell header is converted to (R1, H1) ((1, 0, 0), (1, 3)), and the third ATM cell header is converted to (R1, H1)=((0, 1, m), (1, 4)). The ATM cell demultiplexing section 113-I-1 decides by a value of R10 indicating the AAL information in the routing information R1 whether or not the ATM cell transferred to the cell transfer control section 113-I is an AAL2 cell. If the ATM cell is the AAL2 cell, the ATM cell is transferred to the AAL2 DMX 113-I-2-2, and if the ATM cell is a cell other than the AAL2, the ATM cell is transferred to the ATM cell multiplexing section 113-I-4. In this example, since R10 of the first and second ATM cell is "1" it is decided that the ATM cell is the AAL2, and the ATM cell is transferred to the AAL2 DMX 113-I-2-2. Since R10 of the third ATM cell is "0", the ATM cell is transferred to the ATM cell multiplexing section 113-I-4.

The first and second ATM cells transferred to the AAL2 DMX 113-I-2-2 are converted from the AAL2 cell to the AAL2 partial fill cell, and converted to the routing information R1, the identification number H1 within the device, and the CPS packet header value h1, which are designated by the packet header conversion table 113-I-23 (see FIG. 9) and the ATM cell header conversion table 113-I-28 (see FIG. 10).

In the example shown here, the four CPS packets which are multiplexed and packed into the first AAL2 cell are converted to the AAL2 partial fill cell. The respective ATM cell header and the CPS packet header value are converted to (R1, H1, h1)=((1, 2, m), (1, 11), (0)), ((1, 2, 1), (1, 12,), (0)), ((1,2, 1), (1, 13), (0)) and ((1, 4, m) (1, 14), (0)). Similarly, the three CPS packets, which are multiplexed and packed into the second AAL2 cell, are converted to the AAL2 partial fill cell. The respective ATM cell headers and the CPS packet header values are converted to (R1, H1, h1)=((1, 2, m), (1, 11), (0)), ((1, 2, 1), (1, 12,), (0)) and ((1,2, 1), (1, 13), (0)).

The AAL2 cell transferred to the AAL2 DMX 113-I-2-2 is disassembled to the respective CPS packets by the ATM cell disassemble section 113-I-21, and with regard to the CSP packets, the CPS packet header values are changed by the CPS packet header conversion section 113-I-22, based on information of the packet conversion table 113-I-23. In the example shown here, the header value of the four CPS packets multiplexed and packed into the first AAL2 are changed to (H12, h1)=(1, 0), (2, 0), (3, 0) and (4, 0), and the packet header values of the three CPS packets multiplexed and packed into the second ALL2 are changed to (H12, h1)=(1, 0), (2, 0) and (3, 0).

The CPS packets having the changed packet header values by the CPS packet header conversion section 113-I-22 are stored in the cell assemble buffer section prepared for each H12 (ID2 within the device) by the packet distribution section 113-I-24, based on the H12 (ID2 within the device) information. At this time, the H12 (ID2 within the device) information is stored in the logical queue which is prepared for each class in the cell assemble buffer reading-out control section 113-I-29. In the example shown here, since class information (R11) of the first to three CPS packets among the four CPS packets which are multiplexed and packed into the first AAL2 is "2", the respective H12. (D2 within the device) information is queued in the logical queue of R11=2 of the cell assemble buffer reading-out control section 113-I-29. Moreover, since the class information (R11) of the fourth CPS packet is "4", the H12 (ID2 within the device) information of the fourth CPS packet is queued in the logical queue of R1=4 of the cell assemble buffer reading-out control section 113-I-29. The similar processing is performed for the three CPS packets that are multiplexed and packed into the second AAL2 cell. As a result, with regard to the logical queue of R11=2 prepared in the cell assemble buffer reading-out control section 113-I-29, the H12 (ID2 within the device) information is queued in the order of (112) (1), (2), (3), (1), (2) and (3), and the H12 (1D2 within the device) information is queued in the logical queue of R11=4 in the order (H12)=(4).

Next, in the cell assemble buffer reading-out control section 113-I-29, the H12 (1D2 within the device) information is read out preferentially from the logical queue of R11=2 every reading-out timing from the output control section 113-I-3, and the AAL2 partial fill cell is read out from the corresponding cell assemble buffer. An ATM cell header is presented to the read-out AAL2 partial fill cell in the ATM cell header generation section 113-I-27, based on information of the ATM cell header conversion table 113-I-28, and transferred to the ATM cell multiplexing section 113-I-4.

Accordingly, in this example, as shown in L12-3 of FIG. 21, the final CPS packet of the first AAL2 cell is converted to the AAL2 partial fill cell after all of the CPS packets of the second AAL2 cell are transferred, and transferred to the ATM cell multiplexing section 113-I-4.

The ATM cell other than the AAL2 cell transferred from the ATM cell demultiplexing section 113-I-1 and the AAL2 partial fill cell transferred from the AAL2 DMX 113-I-2-2 are multiplexed and packed by the ATM cell multiplexing section 113-I-4. At this time, in the event that a reading-out competition occurs, a reading-out control is performed according to the priority order of the ATM cell. In this example shown here, the reading-out of the AAL2 partial fill cell (R1, H1)=((1, 4, m), (1, 14)) competes with that of the ATM cell (R1, H1)=((0, 1, m), (1, 4)). When the reading-out competition occurs, the reading-out control is performed according to the value of R11 showing a class in the routing information. Hereupon, since R11 of the AAL2 partial fill cell is "4" and R1 of the ATM cell is "1", the ATM cell is read out preferentially, and the ATM cell read out is transferred to the ATM switching section 120.

As the reading-out control method from the buffer prepared for each class, the complete priority control was described above as an example, in which the information is read out initially from a buffer of a low priority class only when no information is stored in a high priority buffer. However, a method called Weighted Round Robin (WRR) can be applied to this embodiment, in which a weighting is performed for a buffer corresponding to each class and a reading-out control is carried out according to a priority order by weighting. Moreover, though in this embodiment, the example illustrated in FIG. 17 was employed as an example of the class information, the distribution method of the class can be arbitrarily set by the control section 130.

As to a cell which was not preferentially read out, it can be read afterward or this cell can be disused.

What is claimed is:

1. A cell exchanging device which exchanges a plurality of variable length packets multiplexed and packed into one cell to be transferred in an Asynchronous Transfer Mode, comprising:

a plurality of receiving interface sections for receiving a cell;

a plurality of transmitting interface sections for transmitting the cell; and a switching section for exchanging the cell, to which said receiving interface sections and said transmitting interface sections are connected, wherein:

each of said receiving interface section includes a receiving cell transfer control section which disassembles the received cell to demultiplex and unpacked the plurality of variable length packets multiplexed and unpacked in the received cell, and converts the received cell to a cell which has one of the demultiplexd and unpacked variable length packets, thereby transferring the cell to said switching section, said switching section transfers the cell transferred from said receiving interface section to said transmitting interface section where a transmission processing is performed depending on a header value of the cell, and said transmitting interface section includes a transmitting cell transfer control section which demultiplexs and unpacks the variable length packet from the cell transferred from said switching section and multiplexes and packs a plurality of variable length packets in one cell, the plurality of variable length packets corresponding to the same output path.

2. The cell exchanging device according to claim 1, wherein said receiving cell transmitting control section includes:

a first cell demultiplexing section for demultiplexing a cell in which a plurality of variable length packets are multiplexed and packed from a cell in which no variable length packet is multiplexed and packed;

a first cell conversion section for receiving the cell in which the plurality of variable length packets are multiplexed and packed, and disassembles the cell to demultiplex and unpack the plurality of variable lengths from the cell, thereby converting the cell to a cell having only one unpacked variable length packet; and a first cell multiplexing section for multiplexing and packing, according to priority order information in a header, the cell converted by said first cell conversion section and the cell in which no variable length packet is multiplexed and packed, the cell being outputted from said first cell demultiplexing section, thereby transferring the cells to said switching section.

3. The cell exchanging device according to claim 2, wherein said first cell conversion section includes:

a first cell disassemble section for disassembling the received cell and for demultiplexing and unpacking the variable length packet therefrom;

a first packet header conversion section for converting a packet header of the variable length packet demultiplexd by said first cell disassemble section;

a first variable length packet distribution section for distributing the variable length packet having the packet header converted by said first packet header conversion section to each of said transmitting interface sections;

a first cell assemble buffer section for multiplexing and packing the variable length packet distributed by said first variable length packet distribution section in one cell; and a first cell header generation section for either generating or presenting a cell header in order to output the cell assembled by said first cell assemble buffer section to said first cell multiplexing section.

4. The cell exchanging device according to claim 3, wherein said first cell multiplexing section includes:

a first cell buffer having a plurality of buffers corresponding to respective classes;

a first cell distribution section for distributing cells to said first cell buffer depending on the classes; and a first cell buffer reading-out control section for performing a priority reading-out control based on priority order information of each cell when the cell in which the plurality of variable length packets are multiplexed and packed competes with the cell in which no variable length packet is multiplexed and packed.

5. The cell exchanging device according to claim 3, wherein said first cell conversion section further includes:

a first cell assemble buffer reading-out control section which has a plurality of buffers corresponding to respective classes, distributes identification information within a device from said first variable length packet distribution section to the buffers for each class, and performs a priority reading-out control based on priority order information of each cell when the cell in which the plurality of variable length packets are multiplexed and packed competes with the cell in which no variable length packet is multiplexed and packed.

6. The cell exchanging device according to claim 3, wherein said first cell conversion section further includes:

a first packet header conversion table which has an area for registering a set of a header value within the device of the received cell and a header value of the demultiplexd and unpacked variable length packet, and an area for registering a set of a header value of the cell within the device, in which the demultiplexd variable length packet is multiplexed and packed, and a header value of the variable length packet, the header value having been converted, wherein said first packet header conversion section retrieves said first packet header conversion table and performs a header conversion.

7. The cell exchanging device according to claim 3, wherein said first cell conversion section includes:

a first cell header conversion table in which cell header information within the device, routing information indicating a cell transfer route and cell identification number within the device are registered so as to correspond to each other, and wherein said first cell header generation section retrieves said first cell header conversion table based on the cell header value within the device, and performs a header conversion.

8. The cell exchanging device according to claim 1, wherein said receiving interface section includes:

a second cell header conversion table in which input cell header information of the received cell, routing information indicating a cell transfer route and cell identification number within the, device are registered so as to correspond to each other; and a first cell header conversion section which retrieves said second cell header conversion table based on a header value of the received cell, obtains the routing information and the cell identification number within the device, both corresponding to each other, and converts the header value of the received cell.

9. The cell exchanging device according to claim 8, wherein the routing information in said second cell header conversion table includes:

information for distinguishing the cell in which the plurality of variable length packets are multiplexed and packed from the cell in which no variable length packet is multiplexed and packed;

information for indicating a priority order of the cells; and information for indicating a transmitting interface section to which the cell is transferred.

10. The cell exchanging device according to claim 1, wherein said transmitting cell transfer control section includes:

a second cell demultiplexing section which demultiplexs the cell composed of only one variable length packet from the cell in which no variable length packet is multiplexed and packed;

a second cell conversion section which receives the cell having only one packed variable length packet, and converts the cell to a cell in which a plurality of variable length packets are multiplexed and packed; and a second cell multiplexing section for multiplexing, according to priority order information in the header, the cell in which the plurality of variable length packets are multiplexed and packed, the cell being converted by said second cell conversion section, and the cell in which no variable length packet is multiplexed and packed, the cell being outputted from said second cell demultiplexing section, and for transferring the cell.

11. The cell exchanging device according to claim 10, wherein said second cell conversion section includes:

a second cell disassemble section for disassembling the received cell and for demultiplexing and unpacking the variable length packet therefrom;

a second packet header conversion section for converting a packet header of the variable length packet demultiplexd by said second cell disassemble section;

a second variable length packet distribution section for distributing the variable length packet having the packet header converted by said second packet header conversion section to each of said transmitting interface sections;

a second cell assemble buffer section for multiplexing and packing the variable length packet distributed by said second variable length packet distribution section in one cell; and a second cell header generation section for either generating or presenting a cell header in order to output the cell assembled by said second cell assemble buffer section.

12. The cell exchanging device according to claim 11, wherein said second cell multiplexing section includes:

a second cell buffer having a plurality of buffers corresponding to respective classes;

a second cell distribution section for distributing cells to said second cell buffer depending on the classes; and a second cell buffer reading-out control section for performing a priority reading-out control based on priority order information of each cell when the cell in which the plurality of variable length packets are multiplexed and packed competes with the cell in which no variable length packet is multiplexed and packed.

13. The cell exchanging device according to claim 11, wherein said second cell conversion section further includes:

a second cell assemble buffer reading-out control section which has a plurality of buffers corresponding to respective classes, distributes identification information within a device from said second variable length packet distribution section to the buffers for each class, and performs a priority reading-out control based on priority order information of each cell when the cell in which the plurality of variable length packets are multiplexed and packed competes with the cell in which no variable length packet is multiplexed and packed.

14. The cell exchanging device according to claim 11, wherein said second cell conversion section further includes:

a second packet header conversion table which has an area for registering a set of a header value within the device in which received variable length packets are multiplexed and packed and a header value of the variable length packet, and an area for registering a set of a header value of the cell within the device, the header value of which has been converted, and a header value of the variable length packet on a transmission path, and wherein said second packet header conversion section retrieves said second packet header conversion table and performs a packet conversion based on values of the corresponding multiplexed packet header register areas.

15. The cell exchanging device according to claim 11, wherein said second cell conversion section includes:

a third cell header conversion table in which cell header information within the device, routing information indicating a cell transfer route and cell identification number within the device are registered while corresponding to each other, and wherein said second cell header generation section retrieves said third cell header conversion table based on the cell header value within the device, and performs a header conversion.

16. The cell exchanging device according to claim 15, wherein the routing information in said third cell header conversion table includes:

information for distinguishing the cell in which the plurality of variable length packets are multiplexed and packed from the cell in which no variable length packet is multiplexed and packed;

information for indicating a priority order of the cells; and information for indicating a transmitting interface section to which the cell is transferred.

17. The cell exchanging device according.to claim 10, wherein said transmission interface section includes:

a fourth cell header conversion table in which cell identification number within the device and output cell header information are registered while corresponding to each other; and a second cell header conversion section for retrieving said fourth cell header conversion table based on the cell identification number within the device and for performing a header conversion.

* * * * *